United States Patent
Ohashi

(10) Patent No.: US 10,272,906 B2
(45) Date of Patent: Apr. 30, 2019

(54) POWER TRANSMISSION DEVICE FOR HYBRID VEHICLE

(71) Applicant: Kabushiki Kaisha F.C.C., Hamamatsui-shi (JP)

(72) Inventor: Tatsuyuki Ohashi, Hamamatsu (JP)

(73) Assignee: Kabushiki Kaisha F.C.C., Hamamatsu-shi (JP)

(*) Notice: Subject to any disclaimer, the term of this patent is extended or adjusted under 35 U.S.C. 154(b) by 0 days.

(21) Appl. No.: 15/619,943

(22) Filed: Jun. 12, 2017

(65) Prior Publication Data

US 2017/0274895 A1   Sep. 28, 2017

Related U.S. Application Data

(63) Continuation of application No. PCT/JP2015/084711, filed on Dec. 10, 2015.

(30) Foreign Application Priority Data

Dec. 11, 2014 (JP) .................. 2014-251321

(51) Int. Cl.
*B60K 6/40* (2007.10)
*B60W 20/30* (2016.01)
(Continued)

(52) U.S. Cl.
CPC .......... *B60W 20/30* (2013.01); *B60K 6/387* (2013.01); *B60K 6/40* (2013.01); *B60K 6/48* (2013.01);
(Continued)

(58) Field of Classification Search
CPC ...... B60W 20/30; B60W 10/10; B60W 20/00; B60W 10/30; B60W 10/08; B60W 10/02;
(Continued)

(56) References Cited

U.S. PATENT DOCUMENTS

| 2006/0272869 A1* | 12/2006 | Hidaka | ................ B60K 6/48 180/65.25 |
| 2010/0075798 A1* | 3/2010 | Suzuki | ................ B60K 6/40 477/5 |

(Continued)

FOREIGN PATENT DOCUMENTS

| EP | 1 731 802 A2 | 12/2006 |
| JP | 2002-542752 | 12/2002 |

(Continued)

OTHER PUBLICATIONS

Extended European Search Report dated Oct. 9, 2018 in corresponding European Application No. 15867907.6.

*Primary Examiner* — David J Hlavka
(74) *Attorney, Agent, or Firm* — Harness, Dickey & Pierce, P.L.C.

(57) ABSTRACT

A power transmission device for a hybrid vehicle has a first clutch device (1a) disposed in a drivetrain between an engine (E) and a driving wheel (D). A second clutch device (1b) disposed in a drivetrain extends from a motor (M) to the driving wheel (D). The oil pump (P), connected to the motor (M), supplies oil to a predetermined moving component disposed in the vehicle by using driving power of the motor (M). A transmission (A) is disposed in a drivetrain between the engine (E) and the motor (M) and the driving wheel (D). The transmission adjusts rotation speed of the motor (M). The power transmission device supplying oil by causing the motor (M) to rotate the oil pump (P) at an appropriate rotation speed.

5 Claims, 16 Drawing Sheets

(51) Int. Cl.
*B60K 6/387* (2007.10)
*B60K 6/48* (2007.10)
*B60K 6/543* (2007.10)
*B60L 11/14* (2006.01)
*B60W 10/02* (2006.01)
*B60W 10/08* (2006.01)
*B60W 10/10* (2012.01)
*B60W 10/30* (2006.01)
*B60W 20/00* (2016.01)
*F16H 61/02* (2006.01)
*F16H 61/662* (2006.01)
*F16H 63/50* (2006.01)
*B60K 6/547* (2007.10)
*B60W 10/06* (2006.01)
*B60W 10/107* (2012.01)
*B60W 10/115* (2012.01)
*F16H 57/04* (2010.01)

(52) U.S. Cl.
CPC ............ *B60K 6/543* (2013.01); *B60K 6/547* (2013.01); *B60L 11/14* (2013.01); *B60W 10/02* (2013.01); *B60W 10/06* (2013.01); *B60W 10/08* (2013.01); *B60W 10/10* (2013.01); *B60W 10/107* (2013.01); *B60W 10/115* (2013.01); *B60W 10/30* (2013.01); *B60W 20/00* (2013.01); *F16H 57/0435* (2013.01); *F16H 57/0441* (2013.01); *F16H 61/02* (2013.01); *F16H 61/662* (2013.01); *F16H 63/50* (2013.01); *B60K 2006/4825* (2013.01); *B60W 2520/10* (2013.01); *B60W 2540/10* (2013.01); *B60W 2710/025* (2013.01); *B60W 2710/081* (2013.01); *B60W 2710/1083* (2013.01); *B60W 2710/1088* (2013.01); *Y02T 10/6221* (2013.01); *Y02T 10/6252* (2013.01); *Y02T 10/6286* (2013.01)

(58) Field of Classification Search
CPC .......... B60K 6/40; B60K 6/387; B60K 6/543; B60K 6/48; F16H 63/50; F16H 61/662; F16H 61/02; B60L 11/14
See application file for complete search history.

(56) References Cited

U.S. PATENT DOCUMENTS

| | | | |
|---|---|---|---|
| 2010/0219035 A1 | 9/2010 | Hasewend | |
| 2011/0021312 A1* | 1/2011 | Fukitani | B60K 6/48 477/5 |
| 2011/0024208 A1 | 2/2011 | Wust | |
| 2012/0067685 A1 | 3/2012 | Ohashi et al. | |
| 2012/0073281 A1 | 3/2012 | Hirose et al. | |
| 2012/0199437 A1* | 8/2012 | Okuda | B60K 6/48 192/85.63 |
| 2013/0231815 A1* | 9/2013 | Tanishima | B60K 6/48 701/22 |
| 2013/0297135 A1* | 11/2013 | Yamanaka | B60K 6/48 701/22 |
| 2013/0297136 A1* | 11/2013 | Yamanaka | B60K 6/48 701/22 |
| 2015/0353071 A1* | 12/2015 | Tanishima | B60W 10/115 701/22 |
| 2016/0052382 A1* | 2/2016 | Clark | B60K 6/26 477/5 |
| 2016/0207524 A1* | 7/2016 | Miyaishi | B60K 6/48 |
| 2016/0214610 A1* | 7/2016 | Kotsuji | B60K 6/48 |
| 2017/0142795 A1* | 5/2017 | Vanderzon | H05B 33/0845 |

FOREIGN PATENT DOCUMENTS

| | | |
|---|---|---|
| JP | 2003-191762 | 7/2003 |
| JP | 2004-099030 | 4/2004 |
| JP | 2007-015679 | 1/2007 |
| JP | 2009-150558 | 7/2009 |
| JP | 2010-070137 | 4/2010 |
| JP | 2010-151200 | 7/2010 |
| JP | 2010-260374 | 11/2010 |
| JP | 2012-076510 | 4/2012 |
| JP | 2014-034284 | 2/2014 |
| JP | 2014-066362 | 4/2014 |
| JP | 2014-227150 A | 12/2014 |
| WO | WO00/63041 | 10/2000 |
| WO | WO2010/055637 | 5/2010 |
| WO | WO2013/054409 | 4/2013 |
| WO | WO-2014/054724 A1 | 4/2014 |

* cited by examiner

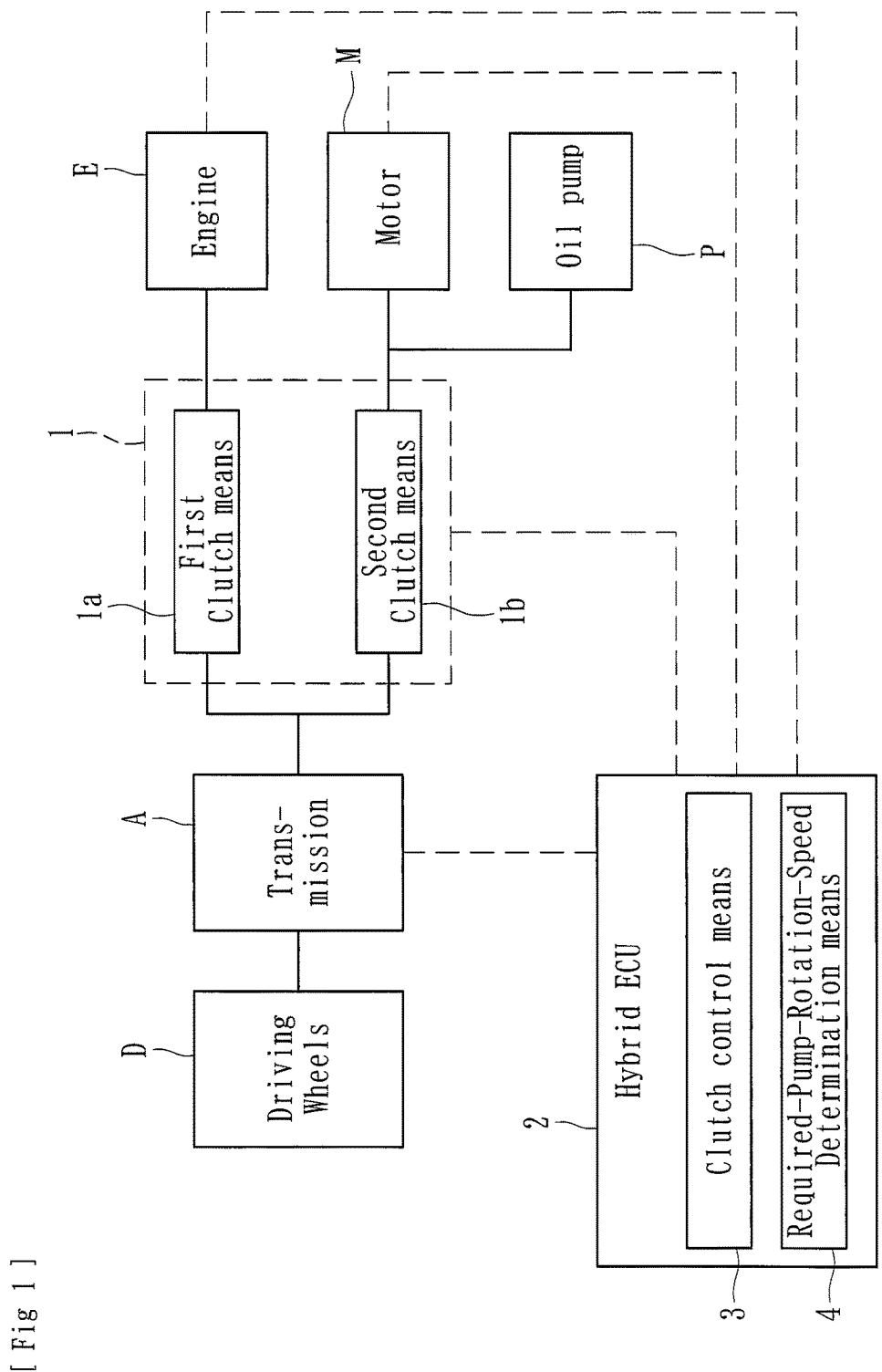
[Fig 1]

[Fig 2]
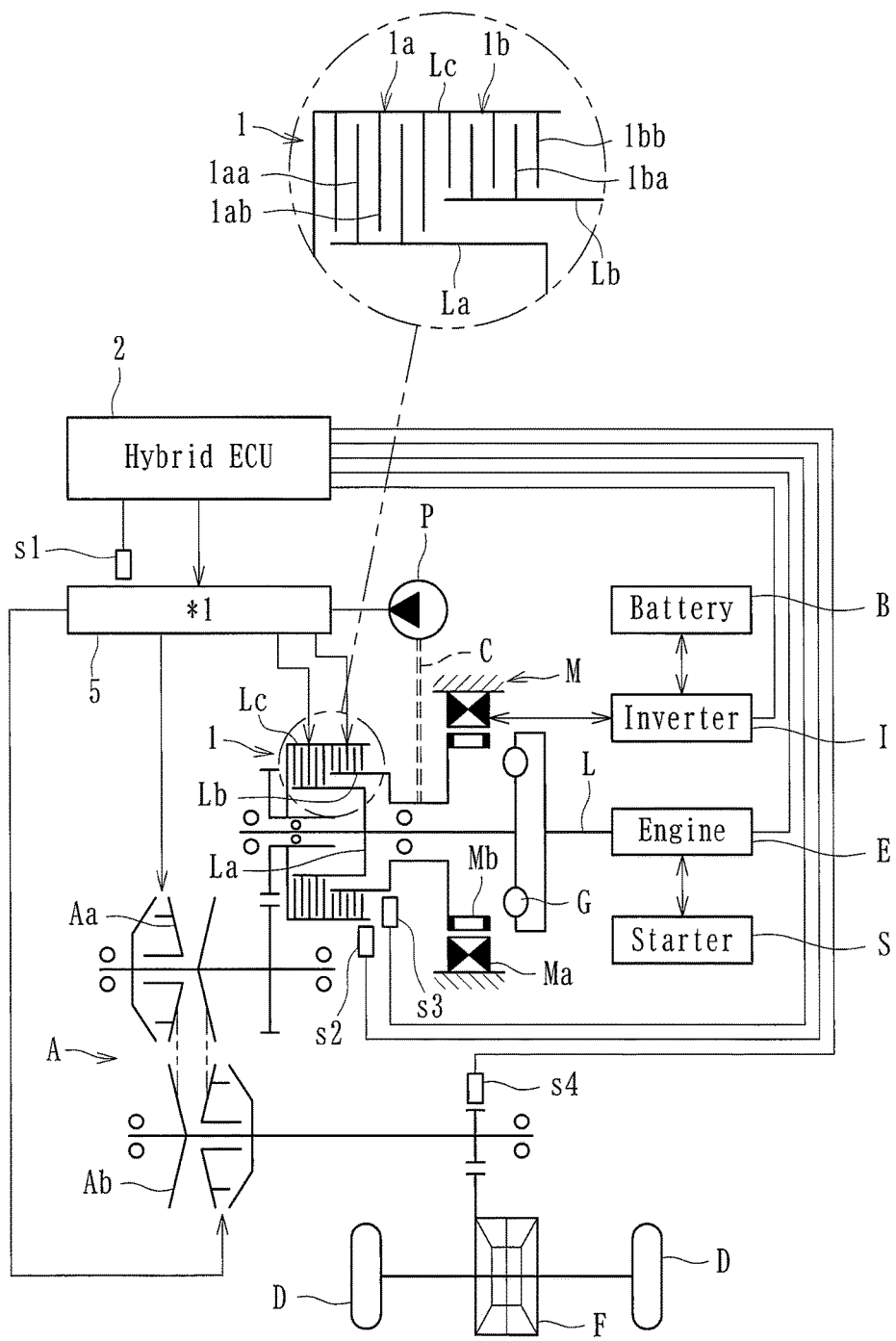
*1:Oil-Pressure control circuit

[Fig 3]
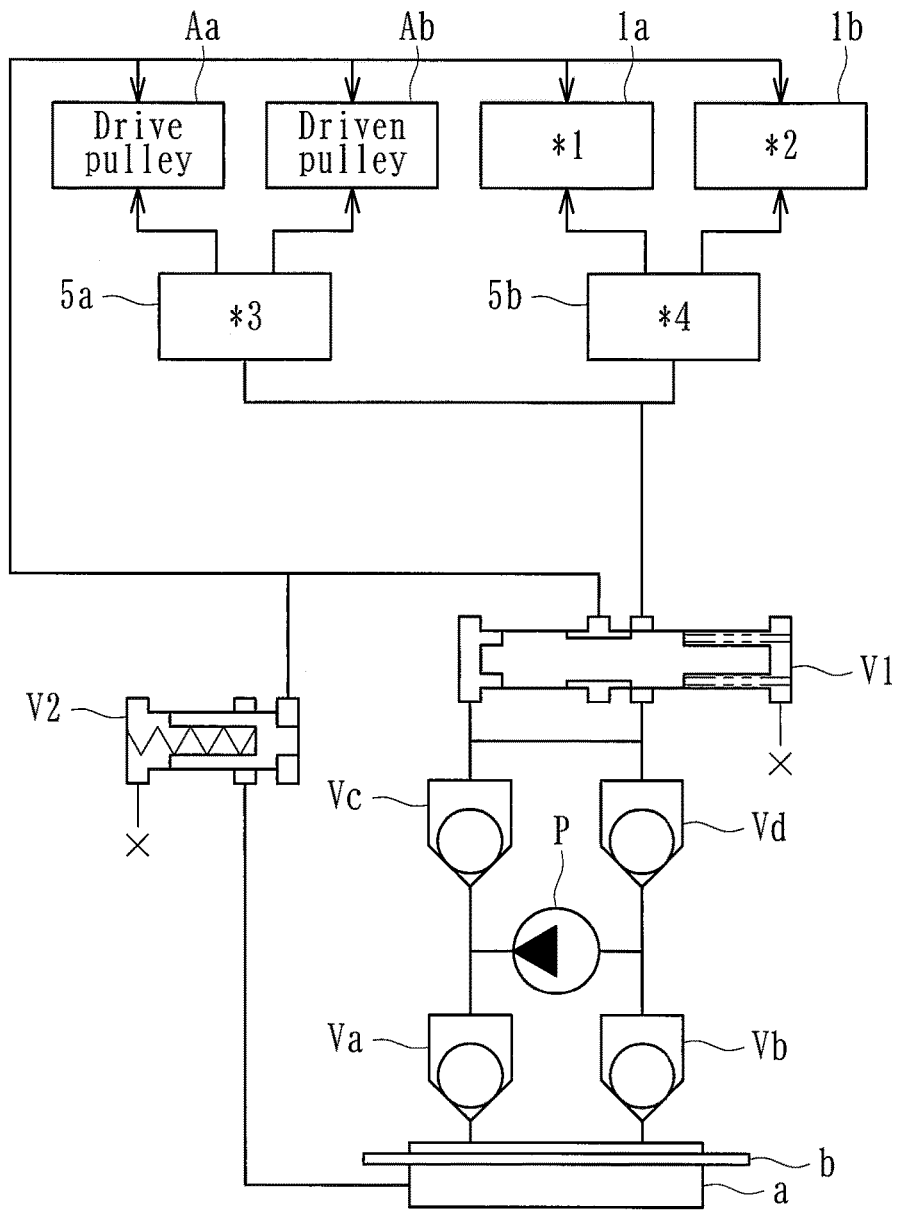
*1: first clutch means
*2: Second clutch means
*3: Pulley-Pressure control circuit
*4: Clutch-Pressure control circuit

[Fig 4]
(a)
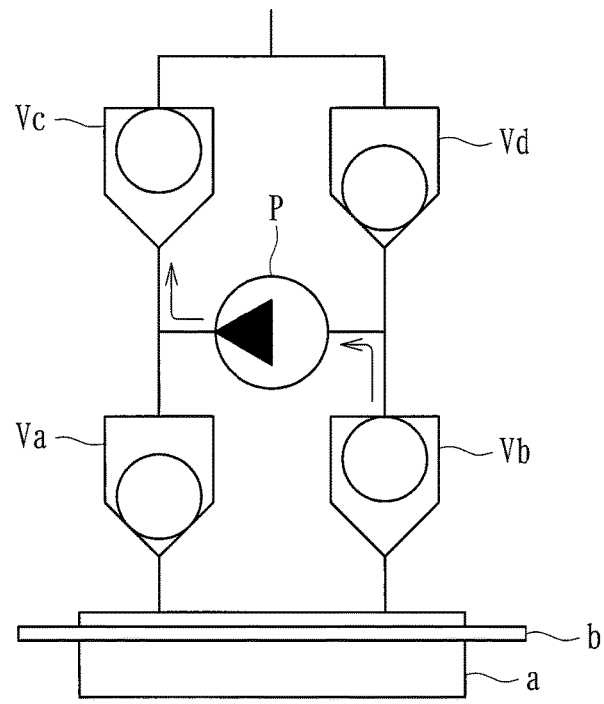
(b)
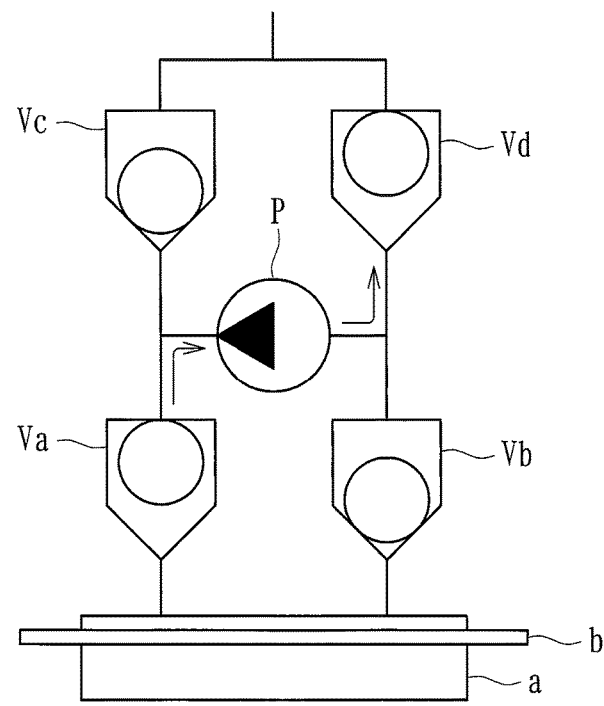

[Fig 5]
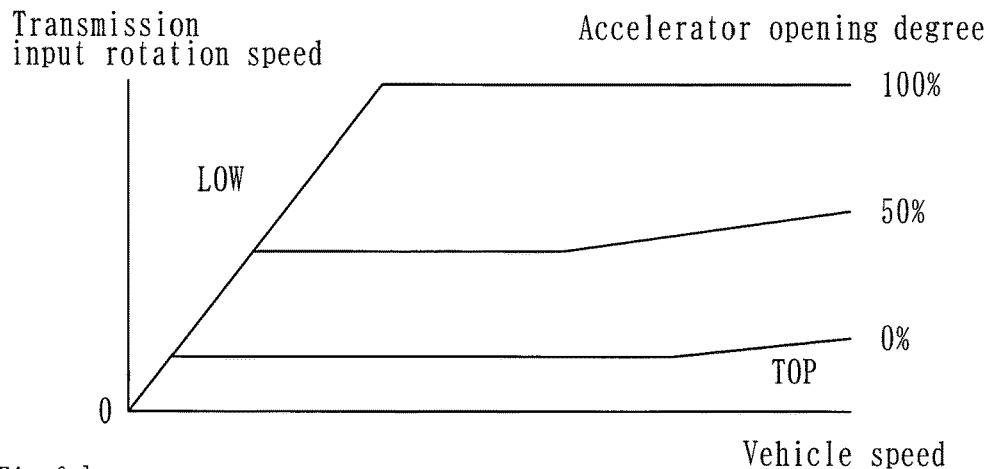
[Fig 6]
(a)
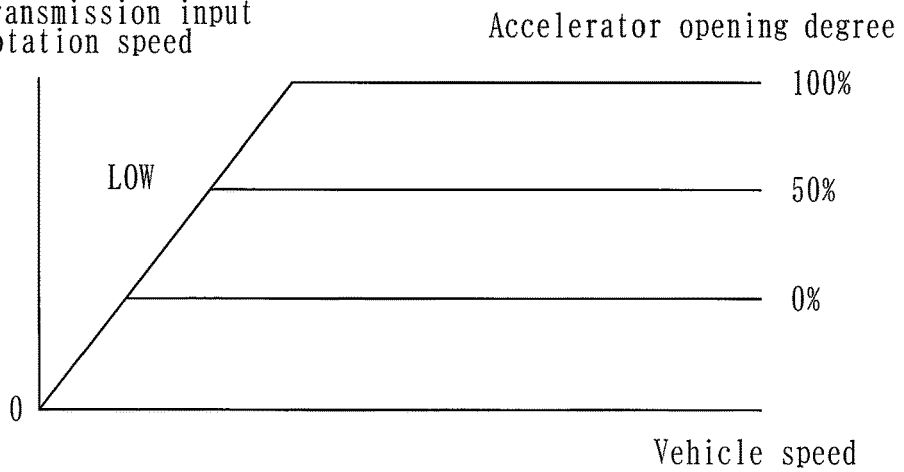
(b)
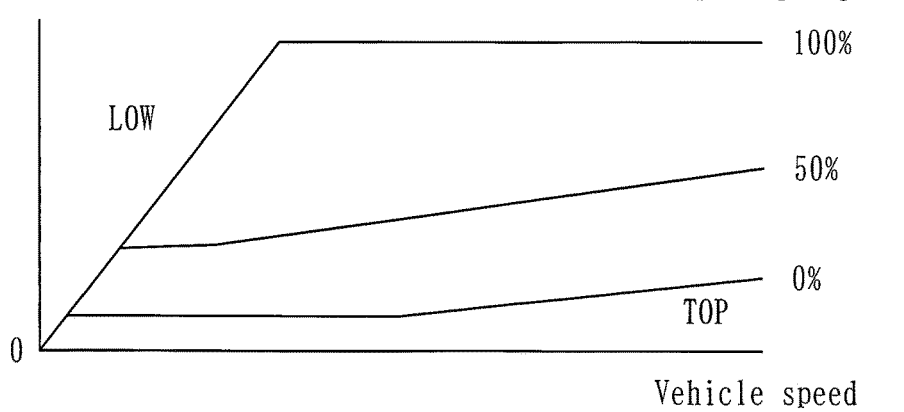

[Fig 7]
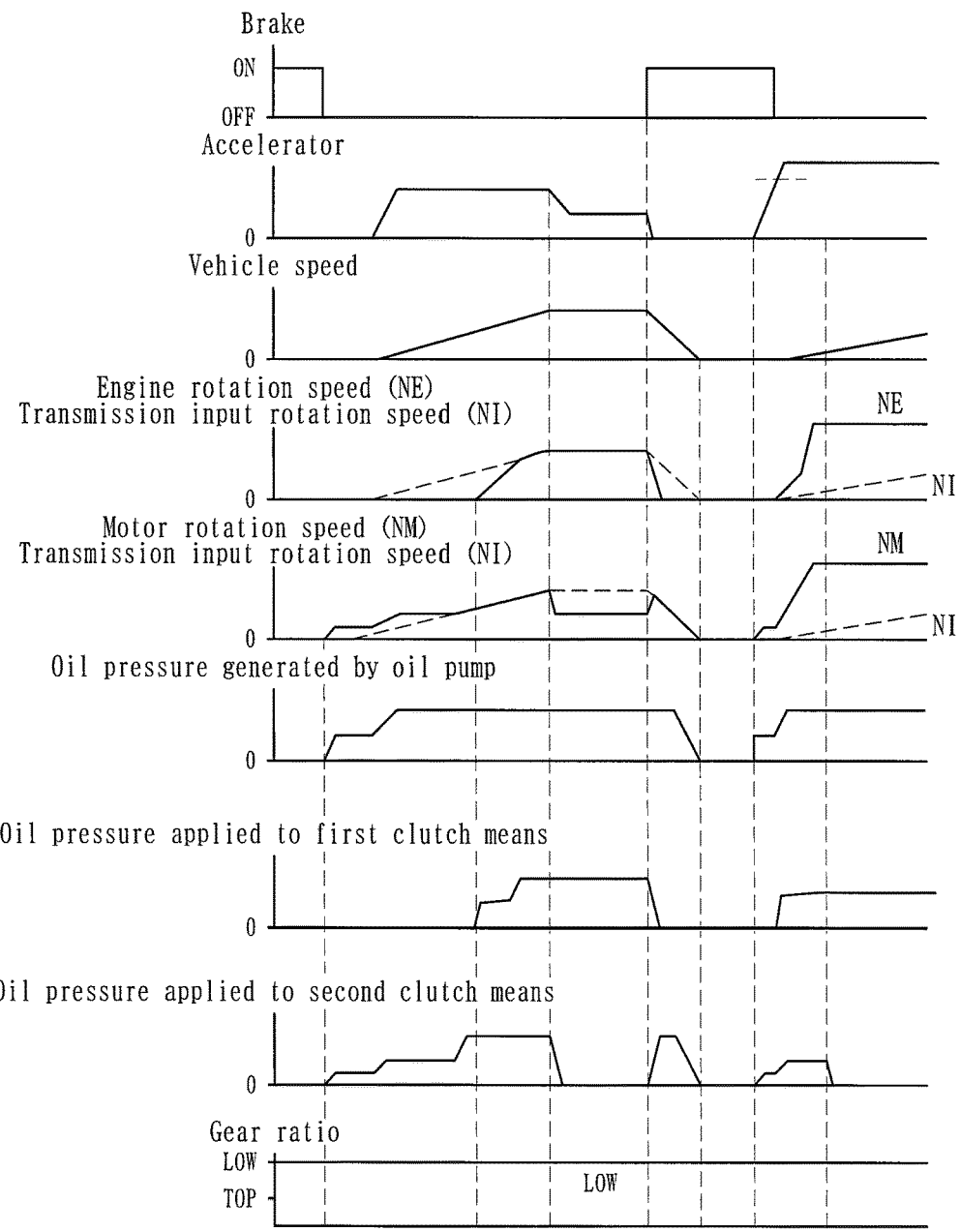

[Fig 8]

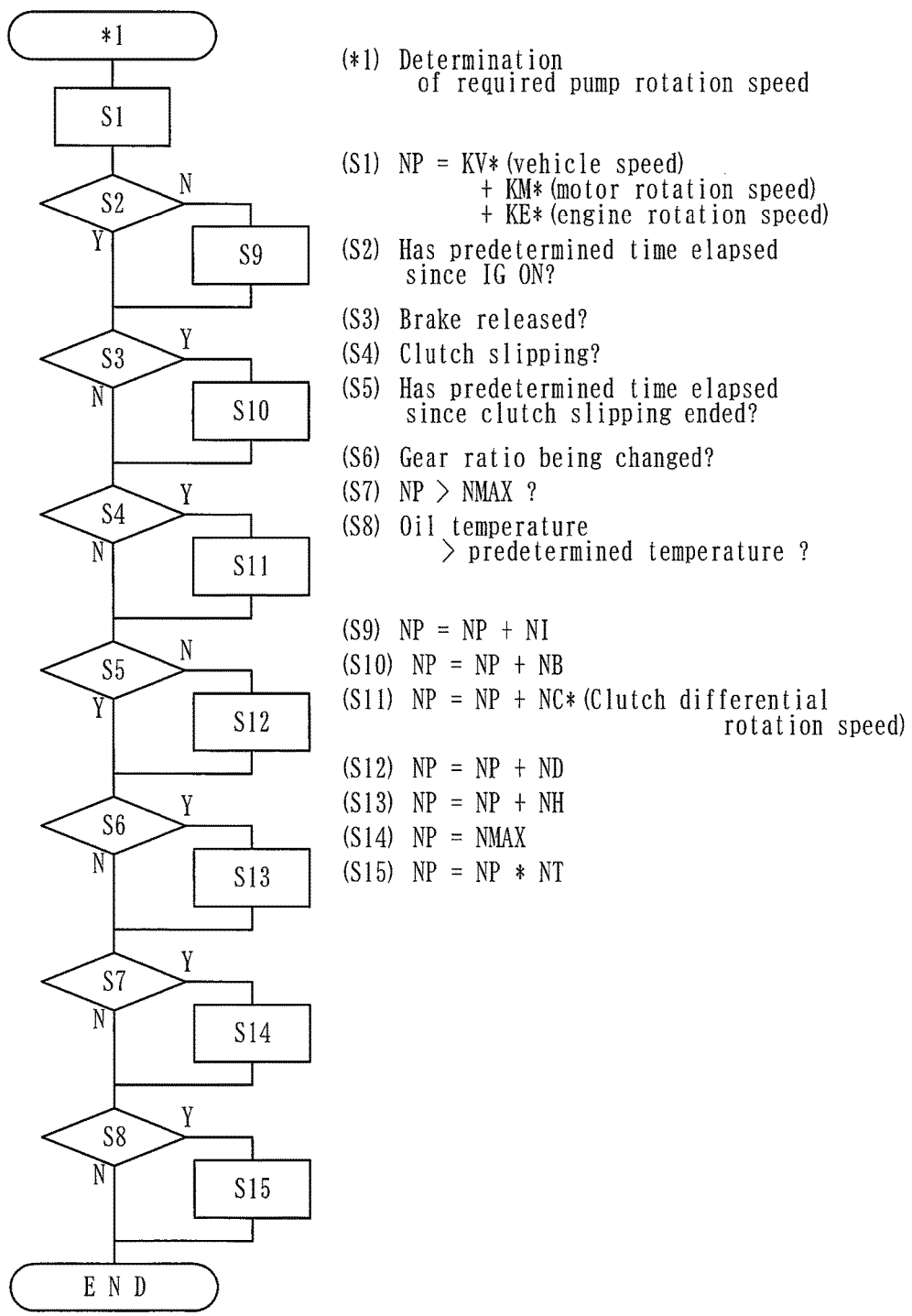

(*1) Determination of required pump rotation speed (S1) NP = KV*(vehicle speed)
     + KM*(motor rotation speed)
     + KE*(engine rotation speed)

(S2) Has predetermined time elapsed since IG ON?

(S3) Brake released?
(S4) Clutch slipping?
(S5) Has predetermined time elapsed since clutch slipping ended?
(S6) Gear ratio being changed?
(S7) NP > NMAX ?
(S8) Oil temperature > predetermined temperature ?

(S9) NP = NP + NI
(S10) NP = NP + NB
(S11) NP = NP + NC*(Clutch differential rotation speed)
(S12) NP = NP + ND
(S13) NP = NP + NH
(S14) NP = NMAX
(S15) NP = NP * NT

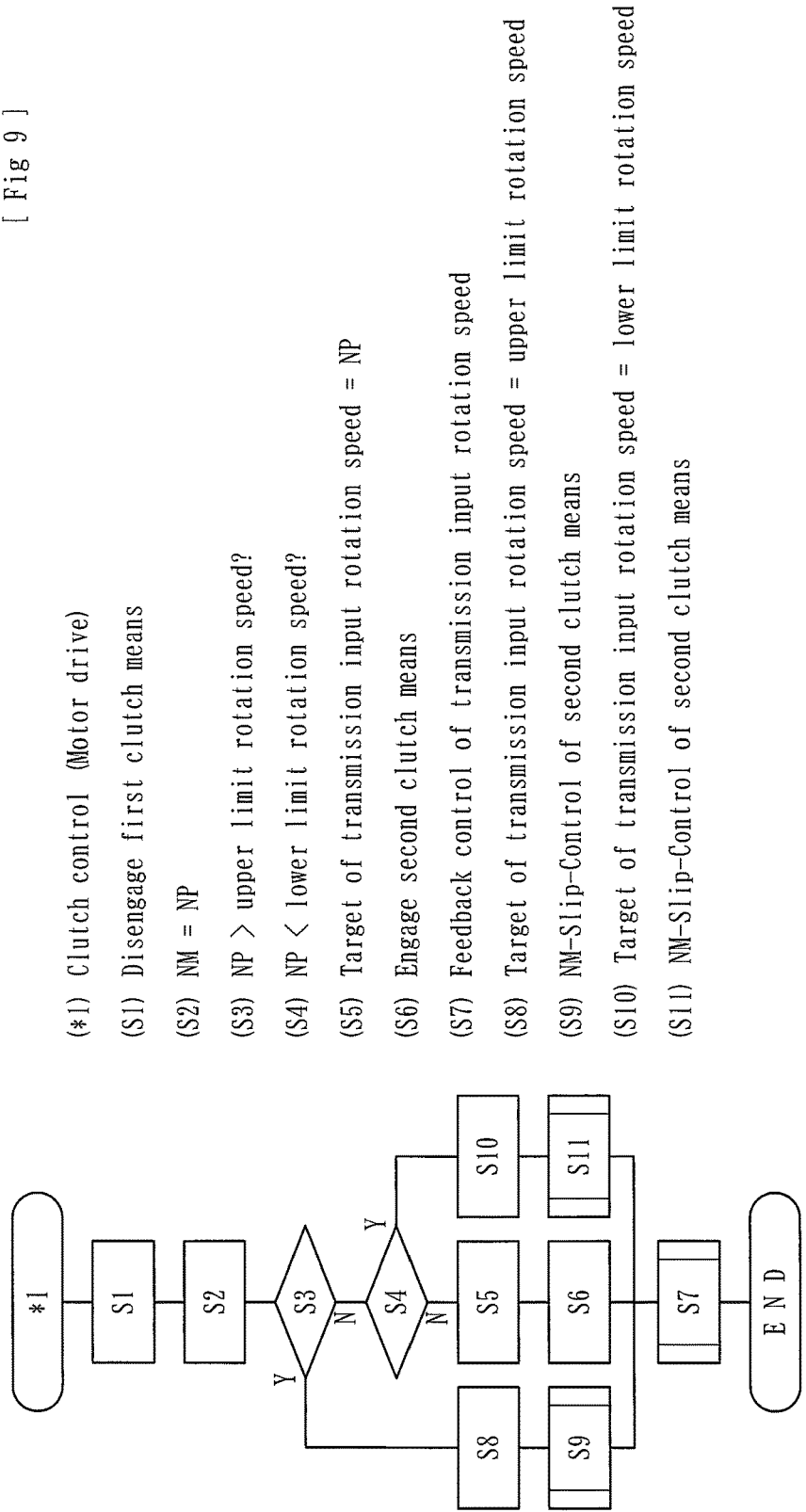

[Fig 9]

(*1) Clutch control (Motor drive)
(S1) Disengage first clutch means
(S2) NM = NP
(S3) NP > upper limit rotation speed?
(S4) NP < lower limit rotation speed?
(S5) Target of transmission input rotation speed = NP
(S6) Engage second clutch means
(S7) Feedback control of transmission input rotation speed
(S8) Target of transmission input rotation speed = upper limit rotation speed
(S9) NM-Slip-Control of second clutch means
(S10) Target of transmission input rotation speed = lower limit rotation speed
(S11) NM-Slip-Control of second clutch means

[ Fig 10 ]
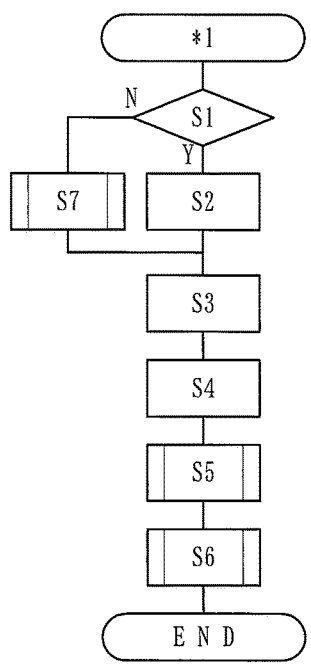
(∗1) Clutch control (engine drive)
(S1) |NE − transmission input rotation speed| < predetermined rotation speed?
(S2) Engage first clutch means
(S3) Disengage second clutch means
(S4) NM = NP
(S5) Feedback control of NM
(S6) Feedback control of transmission input rotation speed
(S7) NE-Slip-Control of first clutch means

[ Fig 11 ]

(*1) Clutch control (Hybrid drive)
(S1) |NE − transmission input rotation speed| < predetermined rotation speed?
(S2) Engage first clutch means
(S3) NM = NP
(S4) NP > upper limit rotation speed?
(S5) NP < lower limit rotation speed?
(S6) Target of transmission input rotation speed = NP
(S7) Engage second clutch means
(S8) Feedback control of transmission input rotation speed
(S9) Target of transmission input rotation speed = upper limit rotation speed
(S10) NM-Slip-Control of second clutch means
(S11) Target of transmission input rotation speed = lower limit rotation speed
(S12) NM-Slip-Control of second clutch means
(S13) NE-Slip-Control of first clutch means

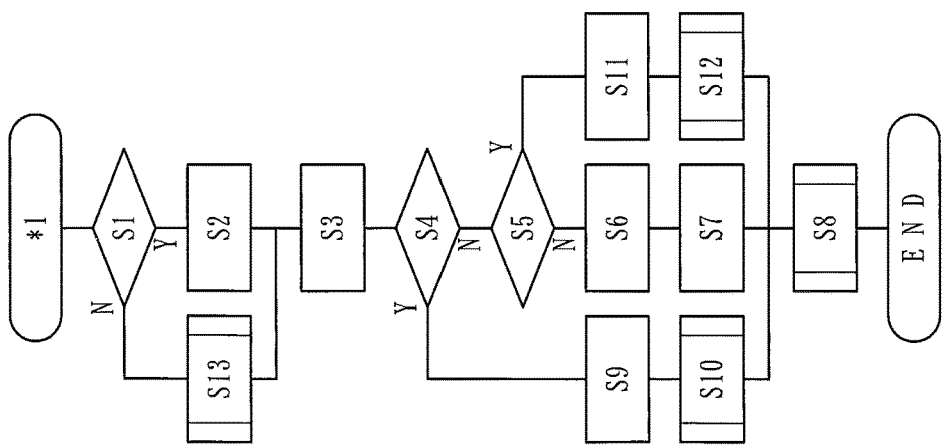

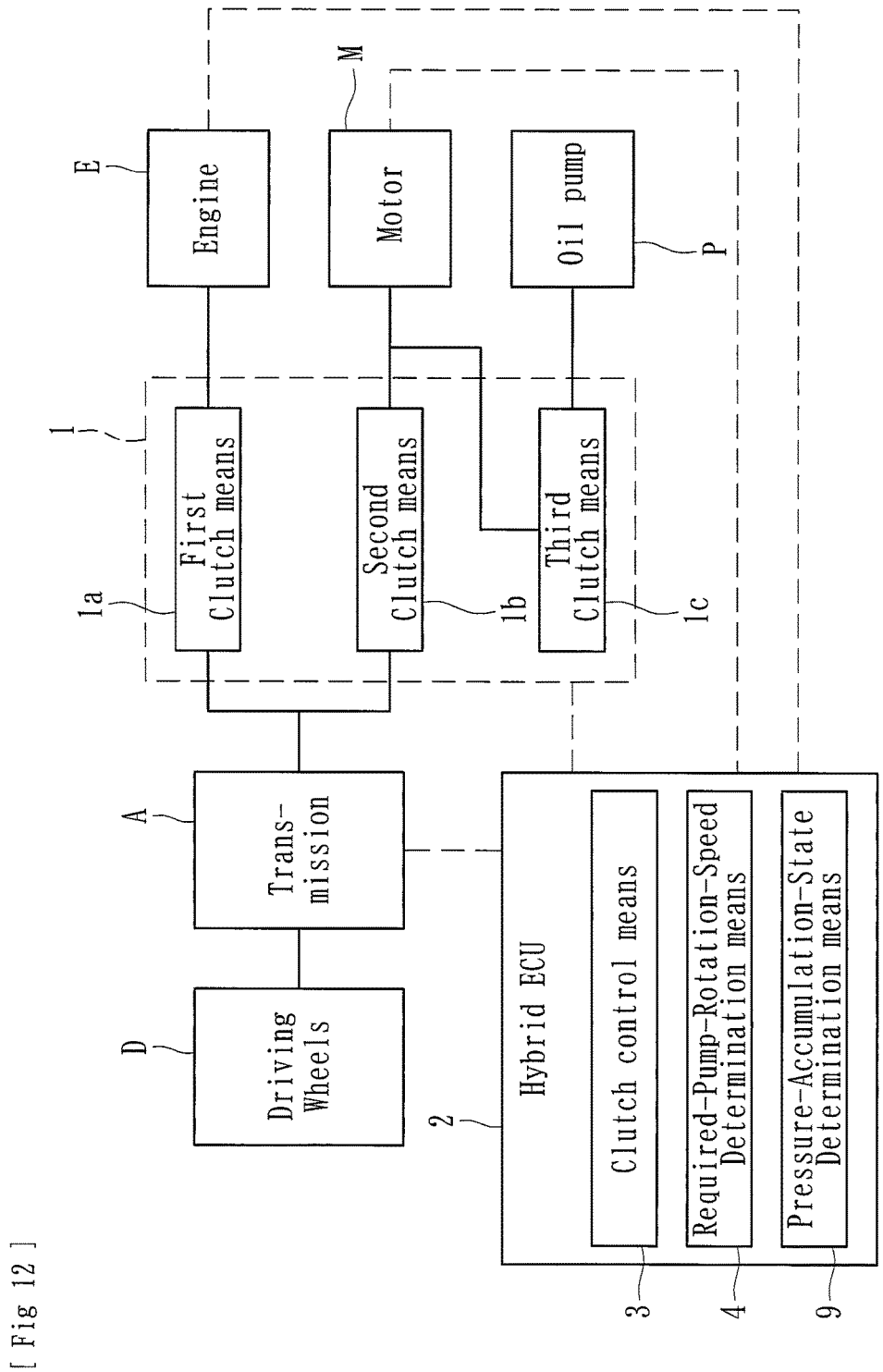
[Fig 12]

[Fig 13]
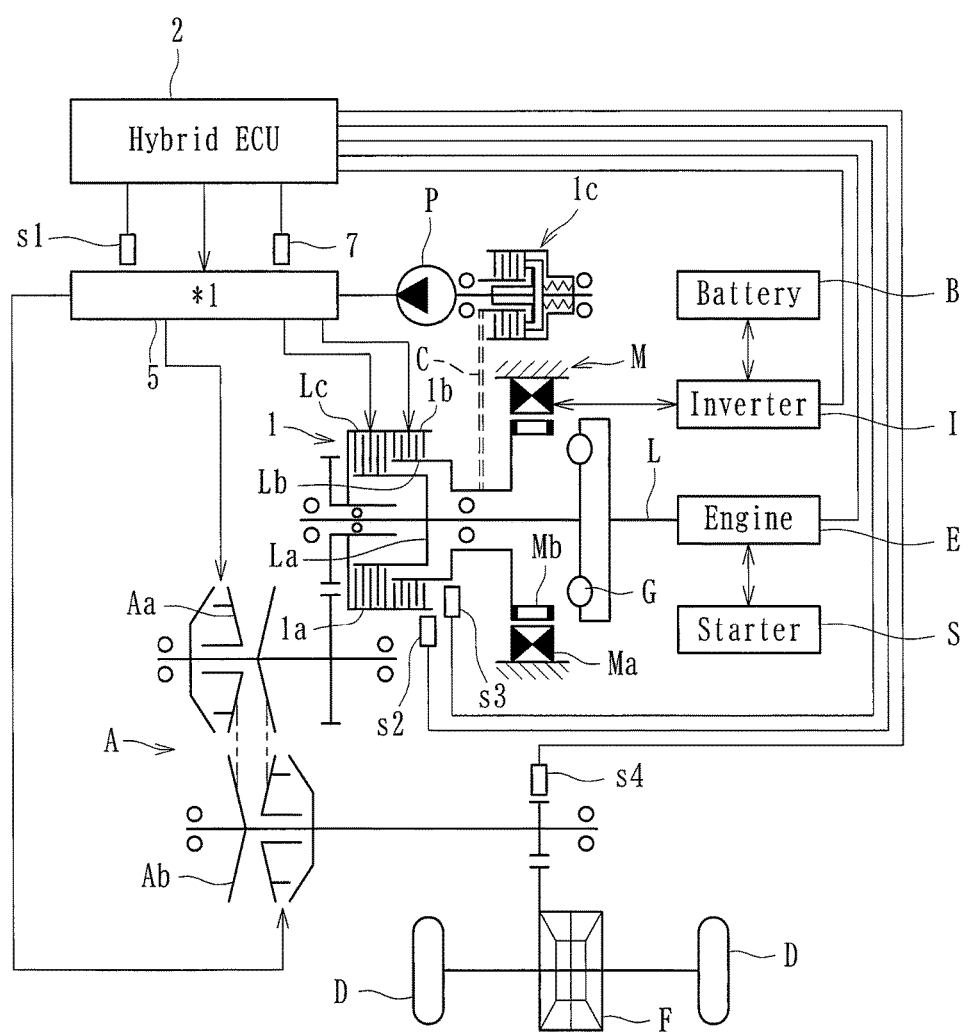
*1:Oil-Pressure control circuit

[Fig 14]
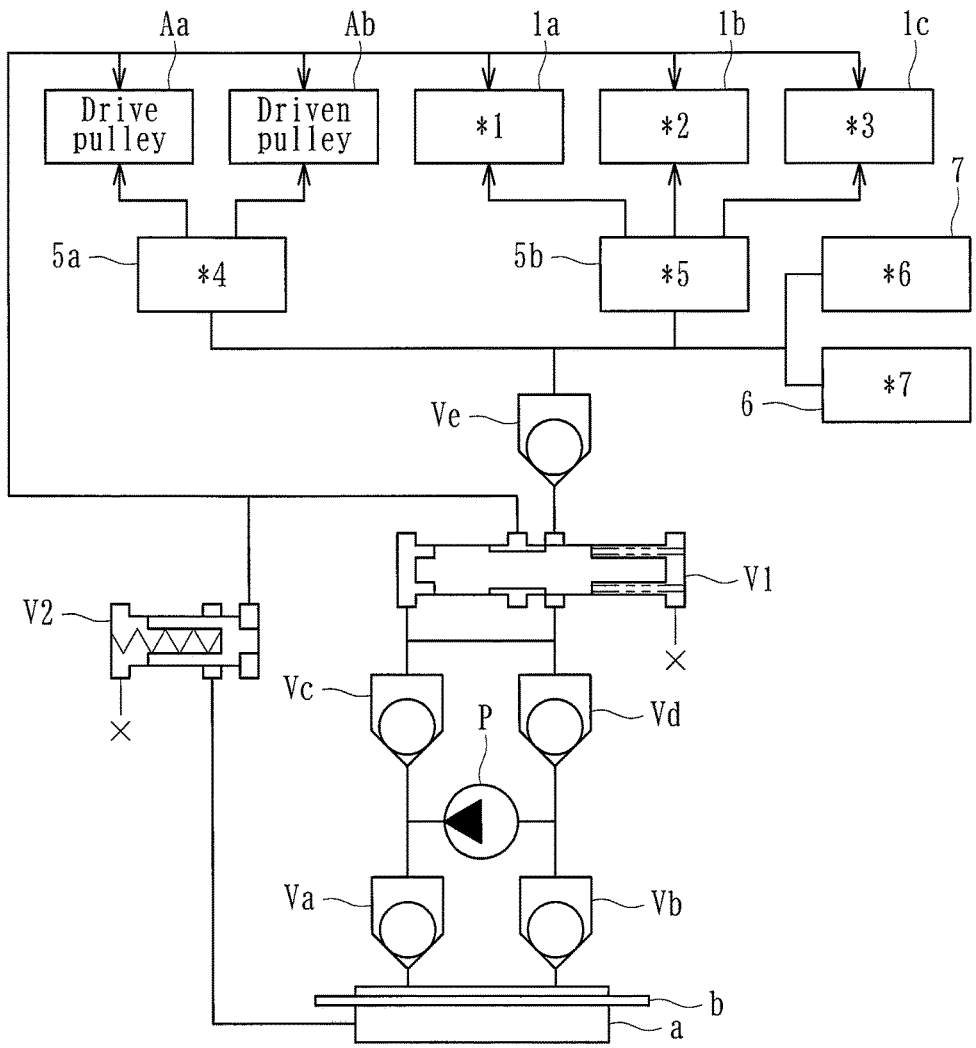
*1: first clutch means
*2: Second clutch means
*3: Third clutch means
*4: Pulley-Pressure control circuit
*5: Clutch-Pressure control circuit
*6: Pressure accumulator
*7: Oil pressure sensor

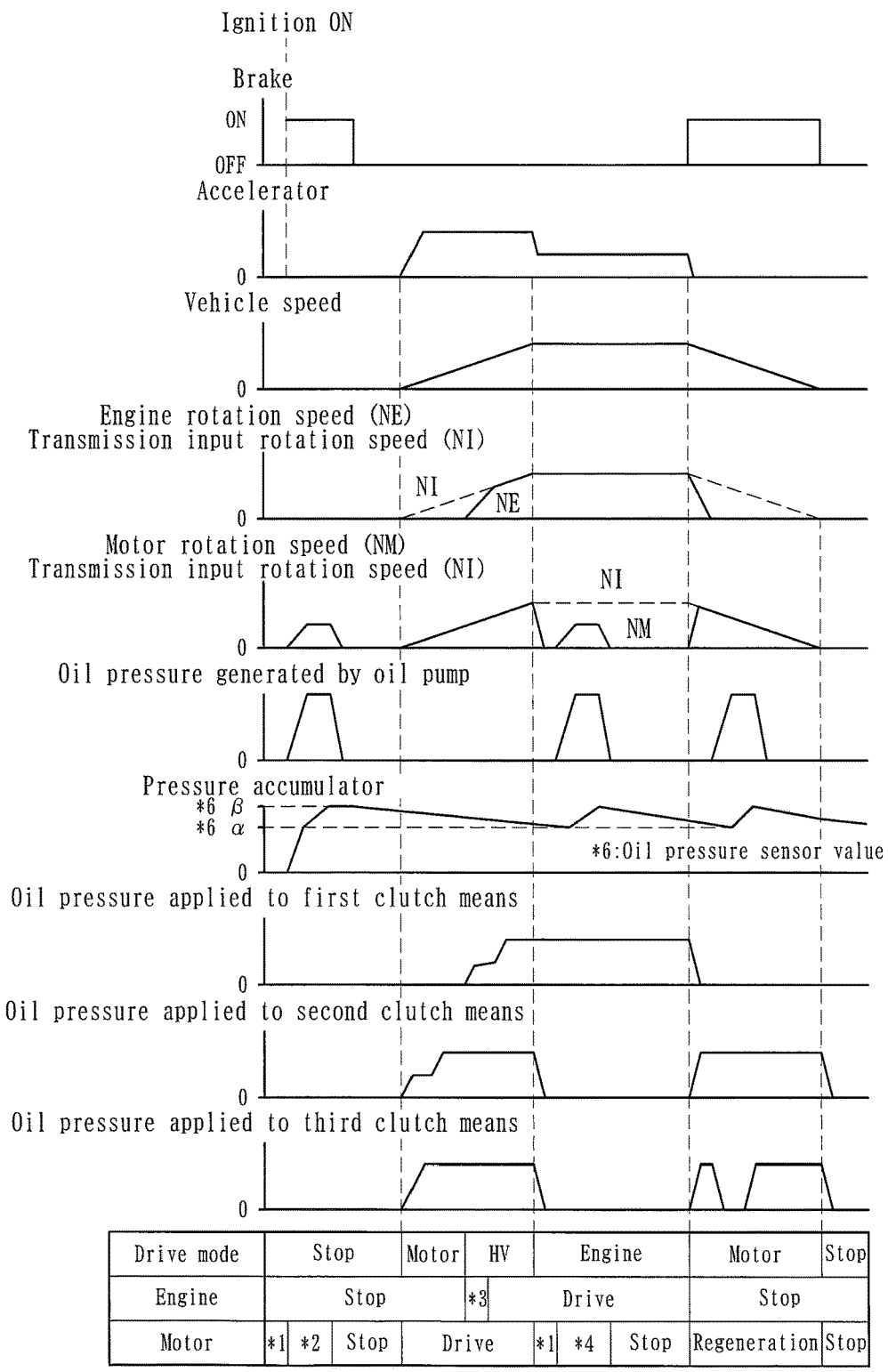
[Fig 15]

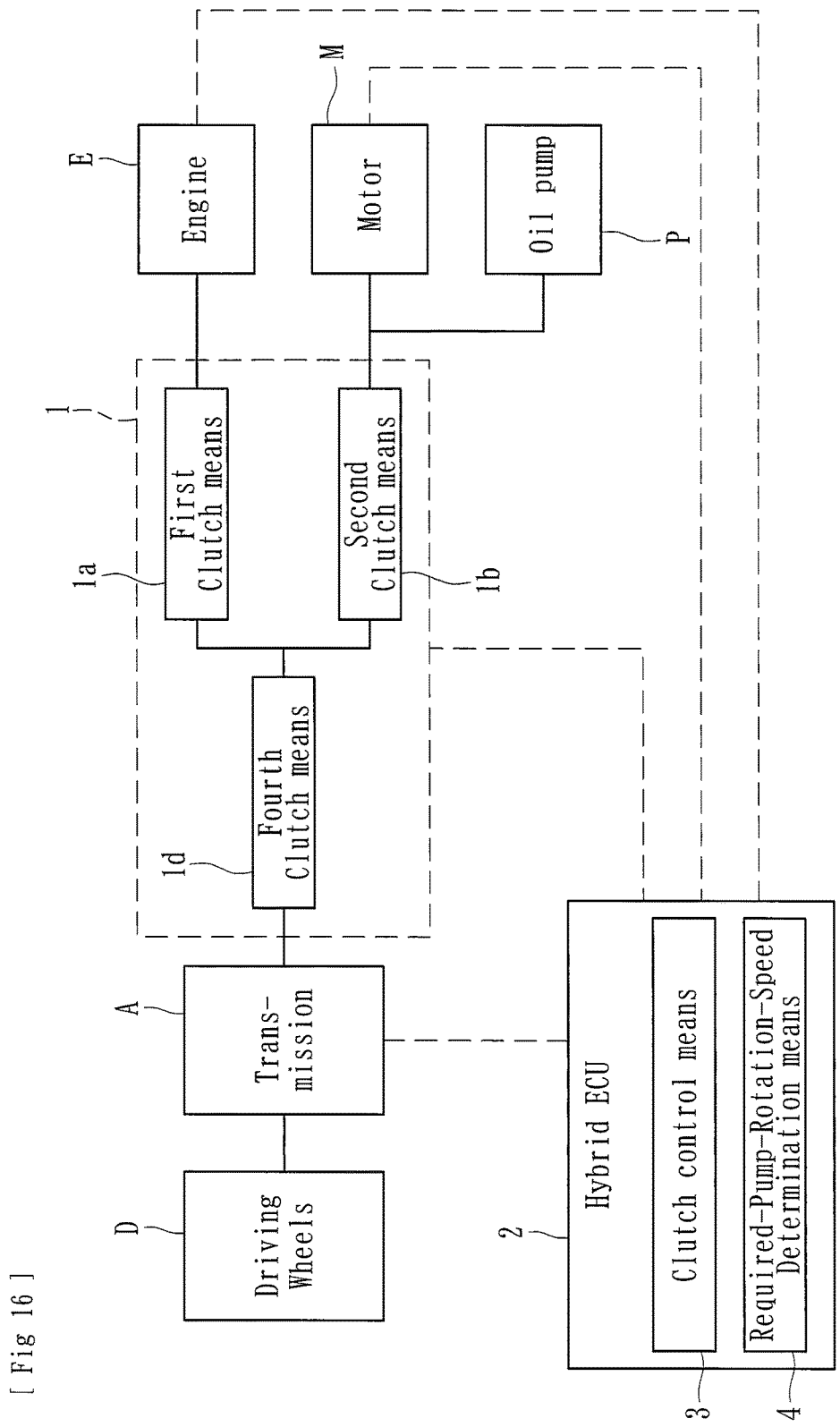
[Fig 16]

[Fig 17]
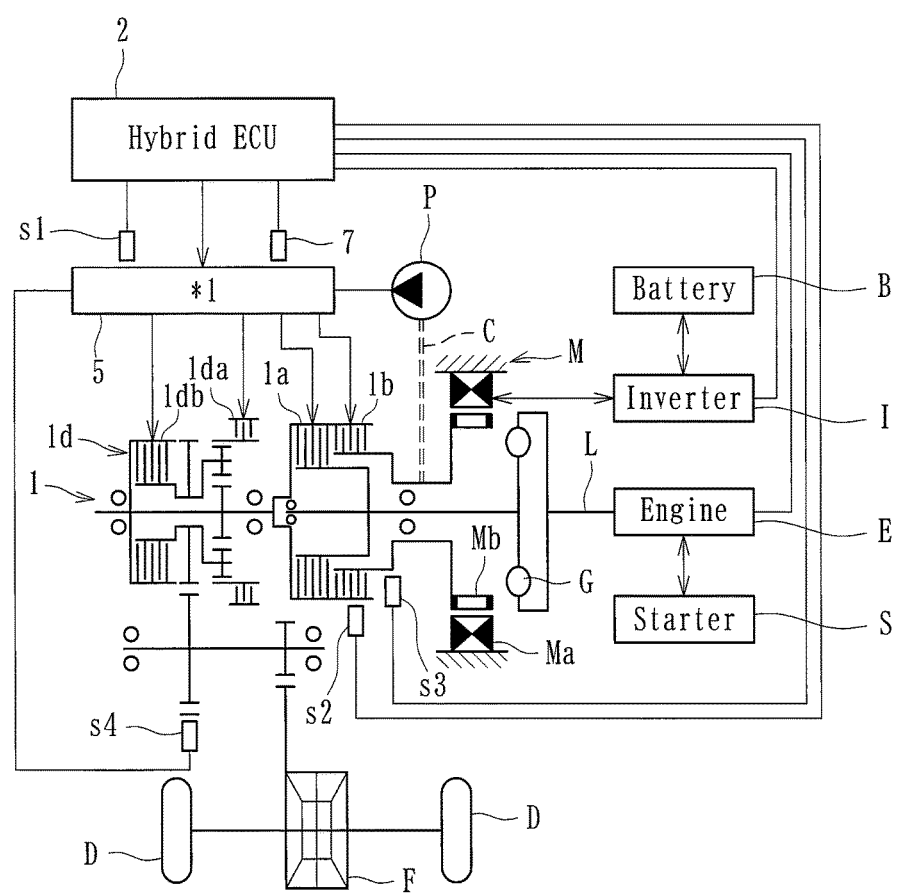
*1:Oil-Pressure control circuit

POWER TRANSMISSION DEVICE FOR HYBRID VEHICLE

CROSS-REFERENCE TO RELATED APPLICATIONS

This application is a continuation of International Application No. PCT/JP2015/084711, filed Dec. 10, 2015, which claims priority to Japanese Application No. 2014-251321, filed Dec. 11, 2014. The disclosures of the above applications are incorporating herein by reference.

FIELD

The present disclosure relates to a power transmission device for a hybrid vehicle that is capable of appropriately transmitting or cutting off the driving power of an engine or a motor in accordance with the driving conditions of the vehicle.

BACKGROUND

Recently, hybrid vehicles, having both an engine and a motor as power sources, have been attracting attention in view of fuel efficiency and environmental measure improvements. The hybrid vehicles selectively and appropriately drive one of the engine and the motor or both the engine and the motor in accordance with the driving conditions. Thus, the hybrid vehicles can achieve higher fuel efficiently and lower gas emission than vehicles that are driven only by an engine.

Regarding a power transmission device for a hybrid vehicle, for example, as disclosed in Japanese Unexamined Patent Application Public No. 2007-15679. A device is proposed that can supply oil to predetermined moving components disposed in the vehicle by rotating an oil pump by driving a motor, which acts as a power source. Although such a power transmission device for a hybrid vehicle can supply oil at any time when the vehicle is being driven, it is not possible to appropriately set the rotation speed of the oil pump. This is because the engine and the oil pump rotate together. In order to avoid such a problem, for example, as disclosed in Japanese Unexamined Patent Application Publication No. 2002-542752 and Japanese Unexamined Patent Application Publication No. 2003-191762, devices have been proposed that can appropriately set the rotation speed of the pump when the vehicle is driven by the engine.

SUMMARY

The existing technology described in Japanese Unexamined Patent Application Publication No. 2002-542752 can appropriately set the rotation speed of the oil pump by using another motor to drive the oil pump. This motor is different from the motor generating driving power to be transmitted to the driving wheels. However, in this technology, a problem exists in that the cost is increased due to the necessity of an additional motor. The existing technology described in Japanese Unexamined Patent Application Publication No. 2003-191762 can appropriately set the rotation speed of the pump when the vehicle is driven by the engine. However, a problem exists in this technology in that it is not possible to set the rotation speed of the oil pump to low when the vehicle is driven by the motor at high speeds. This is due to the fact that the rotation speed of the pump synchronizes with the rotation speed of the driving wheels. Since the capacity of the oil pump is set to fulfill a necessary function, even when the rotation speed of the motor is low, more oil than necessary is supplied when the rotation speed of the motor is high. Thus, due to the excessive supply of oil, extra energy is consumed. As a result, fuel efficiency decreases.

The present disclosure has been devised to overcome the shortcomings of the prior art. The present disclosure provides a power transmission device for a hybrid vehicle that overcomes the deficiencies of the prior art. A method is provided of driving an oil pump by using a motor to generate driving power to be transmitted to driving wheels. It reduces unnecessary rotation of the oil pump by rotating the oil pump at an appropriate speed when the vehicle is driven by the motor or driven by an engine.

A power transmission device for a hybrid vehicle includes a first clutch device disposed in a drivetrain between an engine, installed in the vehicle, and a driving wheel. The first clutch device is capable of transmitting or cutting off driving power of the engine to the driving wheel. A second clutch device is disposed in a drivetrain between a motor, installed in the vehicle, and the driving wheel. The second clutch device is capable of transmitting or cutting off driving power of the motor to the driving wheel. An oil pump is connected to the motor. The oil pump is capable of supplying oil to a predetermined moving component disposed in the vehicle by using the driving power of the motor. The power transmission device is capable of appropriately operating the first clutch device and the second clutch device in accordance with driving conditions of the vehicle. The power transmission device includes a transmission that is disposed in a drivetrain between the engine and the motor and the driving wheel. The transmission is capable of adjusting rotation speed of the motor. The power transmission device is capable of supplying oil by causing the motor to rotate the oil pump at an appropriate rotational speed.

The power transmission device for a hybrid vehicle includes a pump-rotation-speed determination mechanism that is capable of determining a required pump rotation speed of the oil pump based on a required amount of oil to be supplied. The power transmission device is capable of controlling the first clutch device, the second clutch device, or the transmission in accordance with the required pump rotational speed determined by the pump-rotation-speed determination mechanism.

The power transmission device for a hybrid vehicle stores an upper limit transmission characteristic and a lower limit transmission characteristic when the vehicle is driven by the driving power of the motor. The power transmission device determines an upper limit value of an input rotation speed that the transmission allows in accordance with a vehicle speed and an accelerator opening degree and determines a lower limit value of the input rotation speed. If the required pump rotation speed determined by the required-pump-rotation-speed determination mechanism exceeds the upper limit value of the input rotation speed of the transmission determined by the upper limit transmission characteristic, the power transmission device controls the transmission so that the input rotation speed of the transmission becomes the upper limit value. The power transmission device slip-controls the second clutch device to rotate the oil pump at a rotation speed higher than or equal to the required pump rotation speed.

When the vehicle is driven by the driving power of the motor, the power transmission device stores an upper limit transmission characteristic and a lower limit transmission characteristic. The power transmission device determines an upper limit value of an input rotation speed that the transmission allows in accordance with a vehicle speed and an accelerator opening degree and determines a lower limit value of the input rotation speed. If the required pump rotation speed determined by the required-pump-rotation-speed determination mechanism is lower than or equal to the upper limit value of the input rotation speed of the transmission, determined by the upper limit transmission characteristic, and higher than or equal to the lower limit value, the power transmission device controls the transmission so that the rotation speed of the oil pump becomes higher than or equal to the required pump rotation speed. The power transmission device engages the second clutch device.

A pump-reverse-rotation mechanism includes a plurality of check valves. Each check valve allowing oil to flow in only one direction. The pump-reverse-rotation mechanism generating oil pressure by switching between an oil inlet side and an oil outlet side by using the check valves when the oil pump rotates in a reverse direction.

When the vehicle is driven by the driving power of the engine and when the motor rotates the oil pump while the second clutch device cuts off the driving power of the motor, the power transmission device rotates the oil pump at a rotation speed lower than that of a case where the second clutch device is engaged.

The oil pump supplies lubricating oil. When starting the vehicle by driving the engine or the engine and the motor and when the second clutch device cuts off the driving power of the motor or the second clutch device is slipped to rotate the oil pump, the power transmission device rotates the oil pump at a rotation speed higher than that of a case where the second clutch device is engaged.

A pressure accumulator accumulates pressurized oil. The power transmission device supplies oil from the pressure accumulator when the motor is stopped.

A pressure-accumulation-state decision mechanism determines whether or not pressure accumulation by the pressure accumulator is insufficient. The power transmission device drives the motor to rotate the oil pump when the pressure-accumulation-state decision mechanism decides that the pressure accumulation is insufficient.

A third clutch device, of a normally-closed type, is positioned between the motor and the oil pump. The power transmission device disengages the third clutch device to stop the oil pump when the oil pump need not operate.

A fourth clutch device is disposed in a drivetrain between the first clutch device and the second clutch device and the driving wheel. The fourth clutch device transmitting or cutting off power from the first clutch device and second clutch device to the driving wheel. When starting the engine by driving the motor, the power transmission device causes the motor to rotate the oil pump. The power transmission device transmitting the driving power of the motor to the engine via the first clutch device and second clutch device in a state where the fourth clutch device cuts off power.

The power transmission device includes a transmission that is disposed in the drivetrain between the engine and the motor and the driving wheel. The power transmission device adjusts rotation speed of the motor. The power transmission device supplies oil by causing the motor to rotate the oil pump at an appropriate rotation speed. Therefore, in the method of driving the oil pump by using the motor to generate driving power to be transmitted to the driving wheel, it is possible to reduce unnecessary rotation of the oil pump by rotating the oil pump at an appropriate speed when the vehicle is driven by the motor or when the vehicle is driven by the engine.

The power transmission device controls the first clutch device, the second clutch device, or the transmission in accordance with the required pump rotation speed determined by the required-pump-rotation-speed determination mechanism. Therefore, it is possible to more reliably reduce unnecessary rotation of the oil pump.

If the required pump rotation speed, determined by the required-pump-rotation-speed determination mechanism, exceeds the upper limit value of the input rotation speed of the transmission, determined by the upper limit transmission characteristic, the power transmission device controls the transmission. Thus, the input rotation speed of the transmission becomes the upper limit value. The power transmission device slip-controls the second clutch device to rotate the oil pump at a rotation speed higher than or equal to the required pump rotation speed. Therefore, it is possible to rotate the oil pump at a required pump rotation speed. Also, it is possible to make the slip amount of the second clutch device smaller than that of a case where the gear ratio is not adjusted. Thus, the rotation speed of the pump becomes the highest rotation speed that is allowed in accordance with the transmission characteristic.

If the required pump rotation speed determined by the required-pump-rotation-speed determination mechanism is lower than or equal to the upper limit value of the input rotation speed, determined by the upper limit transmission characteristic, and higher than or equal to the lower limit value, the power transmission device controls the transmission. Thus, the rotation speed of the oil pump becomes higher than or equal to the required pump rotation speed. The power transmission device engages the second clutch device. Therefore, it is possible to rotate the oil pump at a required pump rotation speed and to reduce the slip amount of the second clutch device to zero.

The power transmission device includes a pump-reverse-rotation mechanism that generates oil pressure by switching between the oil inlet side and the oil outlet side by using check valves when the oil pump rotates in the reverse direction. Therefore, it is possible to rotate the oil pump at an appropriate rotation speed even when the vehicle is driven by the motor in the reverse direction.

When the vehicle is driven by the driving power of the engine and when the motor rotates the oil pump while the second clutch device cuts off the driving power of the motor, the power transmission device rotates the oil pump at a rotation speed lower than that of a case where the second clutch device is engaged. Therefore, it is possible to reduce unnecessary rotation of the oil pump.

The oil pump supplies lubricating oil. When starting the vehicle by driving the engine or the engine and the motor and when the second clutch device cuts off the driving power of the motor or the second clutch device is slipped to rotate the oil pump, the power transmission device rotates the oil pump at a rotation speed higher than that of a case where the second clutch device is engaged. Therefore, it is possible to supply a larger amount of lubricating oil and to reduce the size of the oil pump.

The power transmission device includes a pressure accumulator to accumulate pressurized oil. The power transmission device supplies oil from the pressure accumulator when the motor is stopped. Therefore, for example, it is possible to supply oil if the motor is stopped when the vehicle is driven by the engine.

The power transmission device includes a pressure-accumulation-state decision mechanism to determine whether or not pressure accumulation by the pressure accumulator is insufficient. The power transmission device drives the motor to rotate the oil pump when the pressure-accumulation-state decision mechanism decides that the pressure accumulation is insufficient. Therefore, it is possible to reliably supply oil.

The power transmission device includes a third clutch device, of a normally-closed type, between the motor and the oil pump. When the oil pump need not operate, the power transmission device disengages the third clutch device to stop the oil pump. Therefore, it is possible to reliably stop the oil pump when the motor is driven. When the oil pump needs to operate, the third clutch device is engaged even if, for example, the oil pressure is zero. Therefore, it is possible to reliably rotate the oil pump by driving the motor.

The power transmission device includes a fourth clutch device disposed in a drivetrain between the first clutch device and the second clutch device and the driving wheel. The fourth clutch device transmits or cuts off power from the first clutch device and second clutch device to the driving wheel. When starting the engine by driving the motor, the power transmission device causes the motor to rotate the oil pump. The power transmission device transmits the driving power of the motor to the engine via the first clutch device and second clutch device in a state where the fourth clutch device cuts off power. Therefore, when starting the engine by driving the motor, it is possible to prevent the driving power to be transmitted to the driving wheel D and to maintain the vehicle in a stopped state. Accordingly, it is possible to start the engine without using a starter when the vehicle is stopped.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic view of a power transmission device for a hybrid vehicle according to a first embodiment.

FIG. 2 is a schematic view of the overall structure of the power transmission device for a hybrid vehicle.

FIG. 3 is a schematic view of an oil-pressure control circuit of the power transmission device for a hybrid vehicle.

FIG. 4 is a schematic view of the oil-pressure control circuit (a) in a state where a motor is rotating in the forward direction; and (b) in a state where the motor is rotating in the reverse direction.

FIG. 5 is a graph representing the transmission characteristic of the power transmission device for a hybrid vehicle when the vehicle is driven by an engine.

FIG. 6 shows graphs representing the transmission characteristic of the power transmission device for a hybrid vehicle when the vehicle is driven by the motor and when the vehicle is hybrid-driven.

FIG. 7 is a timing chart representing how the power transmission device for a hybrid vehicle is controlled.

FIG. 8 is a flowchart representing determination of a required pump rotation speed of the power transmission device for a hybrid vehicle.

FIG. 9 is a flowchart representing clutch control (motor drive) of the power transmission device for a hybrid vehicle.

FIG. 10 is a flowchart representing clutch control (engine drive) of the power transmission device for a hybrid vehicle.

FIG. 11 is a flowchart representing clutch control (hybrid drive) of the power transmission device for a hybrid vehicle.

FIG. 12 is a schematic view of a power transmission device for a hybrid vehicle according to a second embodiment.

FIG. 13 is a schematic view of the overall structure of the power transmission device for a hybrid vehicle.

FIG. 14 is a schematic view of an oil-pressure control circuit of the power transmission device for a hybrid vehicle.

FIG. 15 is a timing chart representing how the power transmission device for a hybrid vehicle is controlled.

FIG. 16 is a schematic view of a power transmission device for a hybrid vehicle according to a third embodiment.

FIG. 17 is a schematic view of the overall structure of the power transmission device for a hybrid vehicle.

DETAILED DESCRIPTION

Hereinafter, embodiments of the present disclosure will be described in detail with reference to the drawings.

A power transmission device for a hybrid vehicle according to a first embodiment is used to transmit or to cut off driving power of an engine E and a motor M, to wheels (driving wheels D). The engine E and motor M are the power sources of the hybrid vehicle. As illustrated in FIGS. 1 and 2, the power transmission device includes a first clutch device 1*a*, second clutch device 1*b*, an oil pump P, a transmission A, and a hybrid ECU 2. The hybrid ECU 2 includes a clutch control mechanism 3 and a required-pump-rotation-speed determination mechanism 4.

As illustrated in FIG. 1, the power transmission device according to the present embodiment includes the first clutch device 1*a*, disposed in a drivetrain between the engine E (installed in the hybrid vehicle) and the driving wheels D. The first clutch device 1*a* is capable of transmitting or cutting off the driving power of the engine E to the driving wheels D. The second clutch means 1*b* is disposed in a drivetrain between the motor M (installed in the hybrid vehicle) and the driving wheels D. The second clutch device is capable of transmitting or cutting off the driving power of the motor M to the driving wheels D. The first clutch device 1*a* and the second clutch device 1*b* constitute a unitized clutch 1.

The engine E (internal combustion engine) is one of the power sources of the hybrid vehicle. As illustrated in FIG. 2, the driving power of the engine E can be transmitted to an input portion La of the clutch 1 (first clutch device 1*a*) via an output shaft L. In FIG. 2, the symbols "S" and "G", respectively, represent a starter for starting the engine and a damper. When the engine E is driven and when the first clutch device 1*a* is in an engaged state or in a slipping state, the driving power of the engine E is transmitted to the transmission A via the input portion La and an output portion Lc of the first clutch means 1*a*.

The motor M includes a stator Ma and a rotor Mb. The motor M is connected to an inverter I and a battery B, installed in the hybrid vehicle. When electric power is supplied from the battery B, the driving power of the motor M can be transmitted to the input portion Lb of the clutch 1 (second clutch device 1*b*). When the motor M is driven and when the second clutch device 1*b* is in an engaged state or in a slipping state, the driving power of the motor M is transmitted to the transmission A via the input portion Lb and the output portion Lc of the second clutch device 1*b*.

The input portion La of the first clutch device 1*a* includes drive-side clutch plates 1*aa*. The clutch plates 1*aa* rotate as the engine E is driven. The output portion Lc of the first clutch device 1a includes driven-side clutch plates 1ab. The drive-side clutch plates 1aa and the driven-side clutch plates 1ab are alternately arranged. Thus, power is transmitted when the drive-side clutch plates 1aa and the adjacent driven-side clutch plates 1ab are pressed against each other. This occurs when hydraulic oil is supplied to a piston in the clutch (not shown) and a press-contact force acts on the clutch plates. Transmission of power is stopped when the press-contact force is released. When the drive-side clutch plates 1aa and the adjacent driven-side clutch plates 1ab slip over each other, a predetermined amount of power can be transmitted.

The input portion Lb of the second clutch device 1b includes drive-side clutch plates 1ba. The drive-side clutch plates 1ba rotate as the motor M is driven. The output portion Lc of the second clutch device 1b includes driven-side clutch plates 1bb. The drive-side clutch plates 1ba and the driven-side clutch plates 1bb are alternately arranged. Thus, power is transmitted when the drive-side clutch plates 1ba and the adjacent driven-side clutch plates 1bb are pressed against each other. Transmission of power is stopped when the press-contact force is released. When the drive-side clutch plates 1ba and the adjacent driven-side clutch plates 1bb slip over each other, a predetermined amount of power can be transmitted.

As illustrated in FIG. 2, the oil pump P is connected to the motor M via a chain C. The oil pump P can supply oil (hydraulic oil or lubrication oil) to predetermined moving components. For example, it supplies oil to the transmission A, the clutch 1, and the like disposed in the vehicle by using the driving power of the motor M. The oil pump P can be controlled by an oil-pressure control circuit 5. The oil-pressure control circuit 5 is connected to the hybrid ECU 2. The oil-pressure control circuit 5 can be appropriately controlled in accordance with a signal transmitted from the hybrid ECU 2.

The transmission A is disposed in a drivetrain between the engine E and motor M and the driving wheels D. The transmission A is composed of a continuously variable transmission that can adjust the driving power of the engine E and the motor M by changing the gear ratio of the transmission and can transmit the power to the wheels D. The transmission A includes a drive pulley Aa and a driven pulley Ab. In the present embodiment, the rotation speed of the motor M is adjustable. When the hybrid vehicle is driven by the driving power of the motor M, driven by only the driving power of the motor M, or driven by the driving power of both the motor M and the engine E, by operating the transmission A it is possible to appropriately change the driving power transmitted to the driving wheels D and to adjust the rotation speed of the motor M. When the rotation speed of the motor M is adjusted, the driving power (torque) needed by the driving wheels D, in accordance with the accelerator opening degree, can be obtained by adjusting the motor torque by controlling an electric current or an electric voltage applied to the motor M.

Thus, when one of the engine E and the motor M is driven (engine drive or motor drive) or both of the engine E and the motor M are driven (hybrid drive) and the first clutch device 1a or the second clutch device 1b is in a power transmitting state (an engaged state or a slipping state), the driving power of the engine E or the motor M is transmitted to the driving wheels D via the transmission A. Thus, the vehicle can move.

As illustrated in FIG. 2, the power transmission device according to the present embodiment includes sensors s1, s2, s3 and s4. The sensor s1 detects the temperature of oil (oil temperature). Sensor s2 detects the input rotation speed of the transmission A. Sensor s3 detects the rotation speed of the motor M (pump rotation speed). Sensor s4 detects the vehicle speed. Electric signals detected by the sensors s1 to s4 are sent to the hybrid ECU 2. In FIG. 2, the symbol "F" denotes a differential gear of the vehicle.

The hybrid ECU 2 is composed of, for example, a microcomputer and the like installed in the vehicle. It can control the oil-pressure control circuit 5 in accordance with the driving conditions of the vehicle. The hybrid ECU 2 includes the clutch control mechanism 3 and the required-pump-rotation-speed determination mechanism 4. The clutch control mechanism 3 appropriately operates the first clutch device 1a and the second clutch device 1b by controlling the oil-pressure control circuit 5. It switches between an engaged state, where power can be transmitted (engaged state or slipping state), and a disengaged state, where power is cut off (disengaged state).

The required-pump-rotation-speed determination mechanism 4 can determine a required pump rotation speed of the oil pump P based on a required amount of oil to be supplied. For example, the required-pump-rotation-speed determination mechanism 4 can determine, by calculation, the required amount of oil to be supplied in accordance with the operation states of predetermined moving components, such as the transmission A, the clutch 1, and the like of the vehicle where oil is to be supplied by the oil pump P. Also, other various conditions of the operation process, such as the time elapsed since the ignition was turned on, the oil temperature, and the like, can be determined.

Here, in the present embodiment, it is possible to control the first clutch device 1a, the second clutch device 1b, or the transmission A in accordance with the required pump rotation speed determined by the required-pump-rotation-speed determination mechanism 4. When the second clutch device 1b cuts off the driving power of the motor M, when the second clutch device 1b is disengaged, it is possible to supply oil by causing the motor M to rotate the oil pump P at an appropriate rotation speed. Thus, when the second clutch device 1b is disengaged and the vehicle is driven by the driving power of the engine E, it is possible to rotate the oil pump P at the required pump rotation speed by rotating the motor M at the required pump rotation speed determined by the required-pump-rotation-speed determination mechanism 4.

Moreover, when the vehicle is driven by the driving power of the motor M, motor drive or hybrid drive, the hybrid ECU 2, according to the present embodiment, stores an upper limit transmission characteristic, see FIG. 6(a). Thus, the ECU 2 can determine an upper limit value of the input rotation speed that the transmission A allows in accordance with the vehicle speed and the accelerator opening degree. Also, a lower limit transmission characteristic can be stored. Thus, the ECU 2 can determine a lower limit value of the input rotation speed (see FIG. 6(b)). If the required pump rotation speed determined by the required-pump-rotation-speed determination mechanism 4 exceeds the upper limit value of the input rotation speed of the transmission A, determined by the upper limit transmission characteristic, as illustrated in FIG. 7, the hybrid ECU 2 controls the transmission A so that the input rotation speed of the transmission A becomes the upper limit value. Thus, the ECU 2 slip-controls the second clutch device 1b to rotate the oil pump P at a rotation speed higher than or equal to the required pump rotation speed. Thus, it is possible to rotate the oil pump P at the required pump rotation speed. Moreover, it is possible to make the slip amount of the second clutch device 1*b* smaller than that of a case where the gear ratio is not adjusted. Thus, the rotation speed becomes the highest rotation speed that is allowed in accordance with the transmission characteristic.

To be specific, in FIG. 6(*a*), a graph extending straight from the origin at an angle represents the rotation speed of the transmission A when the gear ratio is the maximum ratio (LOW). Graphs for accelerator opening degrees of 100%, 50%, and 0% are, respectively, determined by the upper limit of the rotation speed of the transmission, the noise-vibration characteristic, and the regeneration performance when the brake is applied. In FIG. 6(*b*), a graph extending straight from the origin at an angle represents the rotation speed of the transmission A when the gear ratio is the maximum ratio (LOW). Graphs for accelerator opening degrees of 100%, 50%, and 0% are, respectively, determined by the acceleration performance, the noise-vibration characteristic, the rotation speed of the transmission A when the gear ratio is the minimum ratio (TOP) and the deceleration performance when the brake is released. When the vehicle is driven by the driving power of the engine E, the hybrid ECU 2, according to the present embodiment, stores the transmission characteristic shown in FIG. 5. The ECU 2 controls the transmission A in consideration of the transmission characteristic.

When the vehicle is driven by the driving power of the motor M, the hybrid ECU 2, according to the present embodiment, stores the upper limit transmission characteristic and the lower limit transmission characteristic. The ECU 2 can determine the upper limit value of the input rotation speed that the transmission A allows in accordance with the vehicle speed and the accelerator opening degree. Also, the ECU 2 can determine the lower limit value of the input rotation speed. If the required pump rotation speed, determined by the required-pump-rotation-speed determination mechanism 4, is lower than or equal to the upper limit value and higher than or equal to the lower limit value of the input rotation speed of the transmission, determined by the upper limit transmission characteristic, the hybrid ECU 2 controls the transmission A. Thus, the rotation speed of the oil pump P becomes the required pump rotation speed and engages the second clutch device 1*b*. Thus, it is possible to reduce the slip amount of the second clutch device 1*b* to zero.

Moreover, as illustrated in FIG. 3, the power transmission device, according to the present embodiment, includes a pump-reverse-rotation mechanism. The pump-reverse-rotation mechanism includes a plurality of four, in the present embodiment, check valves (Va to Vd). Each check valve is capable of allowing oil to flow only in one direction. The pump-reverse-rotation mechanism can generate oil pressure by switching between the oil inlet side and the oil outlet side by using the check valves (Va to Vd) when the oil pump P rotates in the reverse direction. To be specific, when oil attempts to flow in the upward direction from a lower part of FIG. 3, the check valves (Va to Vd) allow flow of the oil in the upward direction. Thus, as ball valves are opened, the balls of the ball valves separate from the flow openings enabling oil flow. When oil attempts to flow in the downward direction from an upper part of FIG. 3, the check valves (Va to Vd) restrict oil flow in the downward direction. Thus, the ball valves are closed. The balls, of the ball valves, are in contact with the flow openings.

When the motor M is rotating in the forward direction, as illustrated in FIG. 4(*a*), the right side of the oil pump P has a negative pressure and the left side of the oil pump P has a positive pressure. Therefore, the check valves Vb and Vc are open and the check valves Va and Vd are closed. Regarding control oil, oil in an oil pan (a) is supplied to a pulley-pressure control circuit 5*a* and a clutch-pressure control circuit 5*b*, via a regulator valve V1. Thus, the drive pulley Aa and the driven pulley Ab of the transmission A are appropriately controlled by using oil supplied to the pulley-pressure control circuit 5*a*. The first clutch device 1*a* and the second clutch device 1*b* are appropriately controlled by using oil (control oil) supplied to the clutch-pressure control circuit 5*b*.

When the motor M is rotated in the reverse direction, as illustrated in FIG. 4(*b*), the right side of the oil pump P has a positive pressure and the left side of the oil pump P has a negative pressure. Therefore, the check valves Va and Vd are open and the check valves Vb and Vc are closed. Regarding control oil, oil in the oil pan (a) is supplied to the pulley-pressure control circuit 5*a* and the clutch-pressure control circuit 5*b*, via a regulator valve V1. Thus, the drive pulley Aa and the driven pulley Ab of the transmission A are appropriately controlled by using oil (control oil) supplied to the pulley-pressure control circuit 5*a*. The first clutch device 1*a* and the second clutch device 1*b* are appropriately controlled by using oil supplied to the clutch-pressure control circuit 5*b*.

When the motor M is rotating in the forward direction or in the reverse direction, lubricating oil, which is oil in the oil pan (a) that is not used for the pulley-pressure control circuit and the clutch-pressure control circuit, is supplied to the drive pulley Aa and the driven pulley Ab of the transmission A, the first clutch device 1*a*, and the second clutch device 1*b* via the regulator valve V1. Thus, the supplied oil (lubricating oil) maintains lubrication of the drive pulley Aa and the driven pulley Ab of the transmission A, the first clutch device 1*a*, and the second clutch device 1*b*. In FIG. 3, the symbol "b" denotes a strainer (filter) and the symbol "V2" denotes a relief valve.

As described above, the power transmission device includes the pump-reverse-rotation mechanism. The pump-reverse-rotation mechanism can generate oil pressure by switching between the oil inlet side and the oil outlet side. It uses the check valves (Va to Vd) when the oil pump P rotates in the reverse direction. Therefore, it is possible to rotate the oil pump P at an appropriate rotation speed even when the vehicle is reversely driven by the motor. The motor M is rotated in the reverse direction to move the vehicle backward. In particular, the pump-reverse-rotation mechanism, according to the present embodiment, includes the check valves (Va to Vd). Each check valve (Va to Vd) includes a ball valve. Therefore, it is possible to switch between the oil inlet side and the oil outlet side with a simple structure and with high precision.

Moreover, in the present embodiment, the vehicle is driven by the driving power of the engine E. The motor M is driven to rotate the oil pump P while the second clutch device 1*b* cuts off the driving power of the motor M, as illustrated in FIG. 7. Thus, the hybrid ECU 2 controls rotation of the oil pump P at a rotation speed lower than that of a case where the second clutch device 1*b* is engaged. Thus, unnecessary rotation of the oil pump P can be reduced.

The oil pump P according to the present embodiment is capable of supplying lubricating oil. When starting the vehicle by driving the engine E or by driving the engine E and the motor M and when the second clutch device 1*b* cuts off the driving power of the motor M or the second clutch device 1*b* is slipped to rotate the oil pump P, as illustrated in FIG. 7, the power transmission device rotates the oil pump P at a rotation speed higher than that of a case where the second clutch device 1b is engaged. Thus, it is possible to supply a larger amount of lubricating oil and to reduce the size of the oil pump P.

Next, referring to the flowchart of FIG. 8, determination performed by the required-pump-rotation-speed determination mechanism 4, according to the present embodiment, will be described.

First, the required pump rotation speed (NP) is obtained by calculating an expression KV*(vehicle speed)+KM*(motor rotation speed)+KE*(engine rotation speed). KV is the coefficient of the vehicle speed. KM is the coefficient of the rotation speed of the motor M. KE is the coefficient of the rotation speed of the engine E (S1). In step S2, whether or not a predetermined time has elapsed since the ignition switch was turned on is determined. If it is determined that the predetermined time has not elapsed, calculation of NP=NP+NI (rotation speed adjustment for removing air from the control circuit) is performed in step S9.

If it is determined in step S2 that the predetermined time has elapsed and after step S9, it is determined whether or not the brake is released in step S3. If it is determined that the brake is released, calculation of NP=NP+NB (rotation speed adjustment for preparation of starting the vehicle) is performed in step S10. If it is determined in step S3 that the brake is not released (is applied) and after step S10, it is determined whether or not slipping of the first clutch device 1a and the second clutch device 1b occurs in step S4. If slipping occurs, calculation of NP=NP+NC×(clutch differential rotation speed) (rotation speed adjustment for the clutch control and lubrication) is performed in step S11.

If it is determined in step S4 that slipping has not occur and after S11, it is determined whether or not a predetermined time has elapsed since clutch slipping ended in step S5. If it is determined that the predetermined time has not elapsed, calculation of NP=NP+ND (rotation speed adjustment for clutch lubrication) is performed in step S12. If it is determined in step S5 that the predetermined time has elapsed and after step S12, it is determined whether or not the gear ratio is being changed. If it is determined that the gear ratio is being changed, calculation of NP=NP+NH (rotation speed adjustment for pulley control) is performed in step S13.

If it is determined in step S6 that the gear ratio is not being changed and after step S13, it is determined whether or not the required pump rotation speed (NP) is higher than the set upper limit value (NMAX) of the oil pump rotation speed of the oil pump performance in step S7. If it is determined that NP is higher than NMAX, NP is set so that NP=NMAX in step S14. If it is determined in step S7 that NP is not higher than NMAX (the required pump rotation speed is lower than or equal to NMAX) and after S14, it is determined whether or not the oil temperature detected by the oil temperature sensor s1 (see FIG. 2) is higher than a predetermined temperature in step S8. If it is determined that the oil temperature is higher than the predetermined temperature, calculation of NP=NP×NT (adjustment due to the performance temperature of the oil pump P) is performed in step S15. Thus, the required pump rotation speed of the oil pump P is determined.

Next, referring to the flowchart of FIG. 9, clutch control (motor drive) according to the present embodiment will be described.

First, the first clutch device 1a is disengaged to stop transmission of power from the engine E (S1). In step S2, the rotation speed (NM) of the motor is set to NP (the required pump rotation speed of the oil pump P). In step S3, it is determined whether or not the required pump rotation speed (NP), that has been determined, is higher than the upper limit value of the input rotation speed that the transmission A allows in accordance with the transmission characteristic (FIG. 6) when the vehicle is driven by the motor. If it is determined that NP is not higher than the upper limit value, in step S4, it is determined whether or not the required pump rotation speed (NP), that has been determined, is lower than the lower limit value of the input rotation speed that the transmission A allows in accordance with the transmission characteristic (FIG. 6) when the vehicle is driven by the motor.

If it is determined in step S3 that the required pump rotation speed (NP), that has been determined, is higher than the upper limit value of the input rotation speed that the transmission A allows, in step S8, the target of the transmission input rotation speed is set to the upper limit of the rotation speed. In step S9, the second clutch device 1b is slip-controlled so that the motor rotation speed becomes NM. In step S7, feedback control is performed so that the transmission input rotation speed becomes the target of the transmission input rotation speed. If it is determined, in step S4, that the required pump rotation speed (NP), that has been determined, is not lower than the lower limit value of the input rotation speed that the transmission A allows, the target of the transmission input rotation speed is set to NP (the required pump rotation speed of the oil pump P) in step S5. In step S6, the second clutch device 1b is engaged. In step S7, feedback control is performed so that the transmission input rotation speed becomes the target of the transmission input rotation speed. If it is determined, in step S4, that the required pump rotation speed (NP), that has been determined, is lower than the lower limit value of the input rotation speed that the transmission A allows, in step S10, the target of the transmission input rotation speed is set to the lower limit of the transmission input rotation speed. In step S11, the second clutch device 1b is slip-controlled so that the motor rotation speed becomes NM. In step S7, feedback control is performed so that the transmission input rotation speed becomes the target of the transmission input rotation speed.

Next, referring to the flowchart of FIG. 10, clutch control (engine drive) according to the present embodiment will be described.

First, in step S1, it is determined whether or not the absolute value of the difference between the rotation speed (NE) of the engine E and the transmission input rotation speed is lower than a predetermined rotation speed. If it is determined that the absolute value is lower than the predetermined rotation speed, the first clutch device 1a is engaged, in step S2. If it is determined that the absolute value is not lower than the predetermined value, the first clutch device 1a is slip-controlled in step S7. Subsequently, the second clutch device 1b is disengaged in step S3. In step S4, the rotation speed (NM) of the motor M is set to the required pump rotation speed (NP) of the oil pump P. In step S5, feedback control of the rotation speed (NM) of the motor is performed. In step S6, feedback control (gear-ratio-change control) is performed so that the input rotation speed of the transmission becomes the transmission input rotation speed when the vehicle is driven by the engine (FIG. 5).

Next, referring to the flowchart of FIG. 11, clutch control (hybrid drive) according to the present embodiment will be described.

First, in step S1, it is determined whether or not the absolute value of the difference between the rotation speed (NE) of the engine E and the transmission input rotation speed is lower than a predetermined rotation speed. If it is determined that the absolute value is lower than the predetermined rotation speed, the first clutch device 1a is engaged in step S2. If it is determined that the absolute value is not lower than the predetermined rotation speed, the first clutch device 1a is slip-controlled in step S13. In step S3, the rotation speed (NM) of the motor is set to NP (the required pump rotation speed of the oil pump P). In step S4, it is determined whether or not the required pump rotation speed (NP), that has been determined, is higher than the upper limit value of the input rotation speed that the transmission A allows. If it is determined that NP is not higher than the upper limit value, in step S5, it is determined whether or not the required pump rotation speed (NP), that has been determined, is lower than the lower limit value of the input rotation speed that the transmission A allows.

If it is determined in step S4, that the required pump rotation speed (NP), that has been determined, is higher than the upper limit value of the input rotation speed that the transmission A allows, in step S9, the target of the transmission input rotation speed is set to the upper limit of the rotation speed. In step S10, the second clutch device 1b is slip-controlled so that the motor rotation speed becomes NM. In step S8, feedback control is performed based on the transmission input rotation speed. If it is determined, in step S5, that the required pump rotation speed (NP), that has been determined, is not lower than the lower limit value of the input rotation speed that the transmission A allows, in step S6, the target of the transmission input rotation speed is set to NP (the required pump rotation speed of the oil pump P). In step S7, the second clutch means 1b is engaged. In step S8, feedback control is performed based on the transmission input rotation speed. If it is determined, in step S5, that the required pump rotation speed (NP), that has been determined, is lower than the lower limit value of the input rotation speed that the transmission A allows, in step S11, the target of the transmission input rotation speed is set to the lower limit of the rotation speed. In step S12, the second clutch device 1b is slip-controlled so that the motor rotation speed becomes NM. In step S8, feedback control is performed based on the transmission input rotation speed.

In the embodiment described above, the power transmission device, including the transmission A disposed in the drivetrain between the engine E and the motor M, driving wheels D can adjust the rotation speed of the motor M. Also, the power transmission device is capable of supplying oil by causing the motor M to rotate the oil pump P at an appropriate rotation speed. Therefore, the oil pump P is driven by using the motor M. The motor M generates the driving power to be transmitted to the driving wheels D. The vehicle is driven by the motor or driven by the engine. Thus, the oil pump P can be rotated at an appropriate rotation speed. Accordingly, unnecessary rotation of the oil pump P can be reduced. Moreover, the first clutch device 1a, the second clutch device 1b, or the transmission A can be controlled in accordance with the required pump rotation speed determined by the required-pump-rotation-speed determination mechanism 4. Therefore, unnecessary rotation of the oil pump P can be more reliably reduced.

Next, a power transmission device for a hybrid vehicle according to a second embodiment will be described.

As with the first embodiment, the power transmission device for a hybrid vehicle is used to transmit or to cut off driving power of the engine E and the motor M to the wheels (driving wheels D). The engine E and motor M are the power sources of the hybrid vehicle. As illustrated in FIGS. 12 to 14, the power transmission device includes a first clutch device 1a; a second clutch device 1b; a third clutch device 1c; an oil pump P; a transmission A; a hybrid ECU 2 with a clutch control mechanism 3, required-pump-rotation-speed determination mechanism 4, pressure-accumulation-state decision mechanism 9; and a pressure accumulator 6 (see FIG. 14). Elements of the second embodiment that are the same as those in the first embodiment will be denoted by the same reference symbols and their detailed description of such elements will be omitted.

As illustrated in FIGS. 12 and 13, the third clutch device 1c is composed of a clutch of a normally-closed type. The plates are pressed against each other by a spring force when hydraulic oil is not supplied. The press-contact force is released when hydraulic oil is supplied. The third clutch is disposed between the motor M and the oil pump P via a chain C. For example, when the motor M is driven and when the oil pump P need not operate, the oil pump P is stopped by disengaging the third clutch device 1c (so as to cut off power). As with the first clutch device 1a and the second clutch device 1b, the third clutch device 1c includes alternately arranged drive-side clutch plates and driven-side clutch plates. The third clutch device 1c is capable of transmitting power by pressing adjacent drive-side clutch plates and driven-side clutch plates against each other or cutting off power by releasing a press-contact force.

The pressure accumulator 6 is disposed in the oil-pressure control circuit 5. It can accumulate the pressurized oil. As illustrated in FIG. 14, an oil pressure sensor 7 can detect the pressure of oil in the accumulator 6. In FIG. 14, the symbol "Ve" denotes a check valve that allows oil to flow only in one direction. The check valve Ve has a structure similar to those of the check valves (Va to Vd).

The pressure-accumulation-state decision mechanism 9 can decide whether or not pressure accumulation by the pressure accumulator 6 is insufficient based on the detection value of the oil pressure sensor 7. When the pressure-accumulation-state decision mechanism 9 decides that the pressure of the accumulated oil is insufficient (for example, when the detection value of the oil pressure sensor 7 decreases to α, which is the lower limit value), the pressure-accumulation-state decision mechanism 9 drives the motor M to rotate the oil pump P. When the pressure-accumulation-state decision mechanism 9 decides that pressure of the accumulated oil is sufficient (for example, when the detection value of the oil pressure sensor 7 increases to β, which is the upper limit value), the pressure-accumulation-state decision mechanism 9 stops driving the motor M or disengage the third clutch device 1c (so as to cut off power) to stop the oil pump P.

Thus, as illustrated in FIG. 15 (a case where the gear ratio is constant at LOW), the motor M is driven to rotate the oil pump P. The pressure accumulator 6 accumulates pressurized oil until the detection value of the oil pressure sensor 7 becomes β. When the detection value of the oil pressure sensor 7 once becomes β, the motor M is stopped or the third clutch device 1c is disengaged. Thus, the oil pump P does not rotate. The pressurized oil accumulated by the pressure accumulator 6, is discharged. By doing so, oil can be supplied to the drive pulley Aa and the driven pulley Ab of the transmission A, the first clutch device 1a, the second clutch device 1b, and the third clutch device 1c. Moreover, when the detection value of the oil pressure sensor 7 once decreases to α, in the process of supplying oil from the pressure accumulator 6, a control step is performed so that the motor M is driven or the third clutch device 1c is engaged to rotate the oil pump P. The pressure accumulator 6 accumulates the pressurized oil.

In the present embodiment, the power transmission device includes the pressure accumulator 6 that accumulates pressurized oil and can supply oil from the pressure accumulator 6 when the motor M is stopped. Therefore, for example, when the vehicle is driven by the engine E, oil can be supplied even if the motor M is stopped. Moreover, the power transmission device includes the pressure-accumulation-state decision mechanism 9 that can determine whether or not pressure of the pressurized oil in the pressure accumulator 6 is insufficient. When the pressure-accumulation-state decision mechanism 9 decides that the pressure of the accumulated oil is insufficient, the power transmission device drives the motor M to rotate the oil pump P. Therefore, oil can be reliable. Furthermore, the power transmission device includes the third clutch device 1c, of a normally-closed type, between the motor M and the oil pump P. When the oil pump P need not operate, the power transmission device disengages the third clutch device 1c to stop the oil pump P. Therefore, the oil pump P can be reliably stopped when the motor M is driven. When the oil pump P needs to operate, the power transmission device engages the third clutch device 1c even if, for example, oil pressure is zero, and therefore the oil pump P can be reliably rotated by driving the motor.

Next, a power transmission device for a hybrid vehicle according to a third embodiment will be described.

As with the first and second embodiments, the power transmission device for a hybrid vehicle is used to transmit or to cut off driving power of the engine E and the motor M to the wheels (driving wheels D). The engine E and motor M are power sources of the hybrid vehicle. As illustrated in FIGS. 16 and 17, the power transmission device includes first clutch device 1a, second clutch device 1b, fourth clutch device 1d (1da, 1db), an oil pump P, a transmission A, a hybrid ECU 2 with a clutch control mechanism 3 and required-pump-rotation-speed determination mechanism 4. Elements of the third embodiment that are the same as those of the first embodiment will be denoted by the same reference symbols and their detailed descriptions of such elements will be omitted.

The fourth clutch device 1d (1da, 1db) includes a clutch disposed in a drivetrain between the first clutch device 1a and the second clutch device 1b and the driving wheels D. The fourth device is capable of transmitting or cutting off power from the first clutch device 1a and the second clutch device 1b to the driving wheels D. As with the first clutch device 1a and the second clutch device 1b, the fourth clutch device 1d includes alternately arranged drive-side clutch plates and driven-side clutch plates. The fourth clutch device 1d is capable of transmitting power by pressing adjacent drive-side clutch plates and driven-side clutch plates against each other or cutting off power by releasing a press-contact force.

The present embodiment is capable of transmitting power from one to the other of the engine E and the motor M by cutting off power from the engine E and the motor M to the driving wheels D and connecting the engine E and the motor M to each other. Therefore, when the vehicle is stopped and the driving power of the engine E is to be transmitted to the motor M or the driving power of the motor M is to be transmitted to the engine E, it is possible to prevent the driving power from being transmitted to the driving wheels D and to maintain the vehicle in a stopped state. Accordingly, it is possible to start the engine without using a starter when the vehicle is stopped. Thus, it is possible to increase the chance of charging by enabling the motor M to generate electric power while the vehicle is stopped.

The present disclosure is not limited to the embodiments described above. For example, the first to fourth clutch mechanisms 1a to 1d may be clutches of a different type, as long as the power transmission device includes a transmission that is disposed in a drivetrain between the engine and the motor and the driving wheels. The clutch is capable of adjusting the rotation speed of the motor and the power transmission device is capable of supplying oil, by causing the motor to rotate the oil pump P at an appropriate rotation speed. The fourth clutch mechanism 1d may be disposed at any position, such as the input side, a middle position, or the output side of the transmission, as long as the fourth clutch means 1d is capable of transmitting or cutting off power between the first clutch device 1a and the second clutch device 1b and the driving wheels D. The fourth clutch mechanism 1d may be a combination of a plurality of clutches. It is sufficient that the engine E is an internal combustion engine. The engine E may be, instead of an engine that uses gasoline as a fuel, a diesel engine that uses light oil as a fuel, or the like. In the present embodiment, the required-pump-rotation-speed determination mechanism 4 is included in the hybrid ECU 2. Alternatively, for example, the required-pump-rotation-speed determination mechanism 4 may be included in a microcomputer that is disposed independently.

It is possible to apply the present disclosure to a power transmission device for a hybrid vehicle that has a different outer shape or has additional functions, as long as the power transmission device includes a transmission that is disposed in a drivetrain between the engine and the motor and the driving wheels. The power transmission device can adjust the rotation speed of the motor. The power transmission device is capable of supplying oil by causing the motor to rotate the oil pump at an appropriate rotation speed.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A power transmission device for a hybrid vehicle, comprising:
   first clutch device disposed in a drivetrain between an engine, installed in the vehicle, and a driving wheel, the first clutch device transmitting or cutting off driving power of the engine to the driving wheel;
   second clutch device disposed in the drivetrain between a motor, installed in the vehicle, and the driving wheel, the second clutch device transmitting or cutting off driving power of the motor to the driving wheel, the first and second clutch devices drive a common output independently with respect to one another;
   an oil pump connected to the motor, the oil pump capable of supplying oil to a predetermined moving component disposed in the vehicle by using driving power of the motor;
   a power transmission device appropriately operating the first clutch device and the second clutch device in accordance with driving conditions of the vehicle; and
   the power transmission device includes a transmission disposed in the drivetrain between the driving wheel and the engine and motor and driven by the common output, the transmission device is capable of adjusting rotation speed of the motor, the power transmission device is capable of supplying oil by causing the motor to rotate the oil pump at an appropriate rotation speed.

2. The power transmission device of claim 1, further comprising a unitized clutch including the common output.

3. The power transmission device of claim 1, wherein the first clutch device and second clutch device includes adjacent alternating plates on the common output.

4. The power transmission device of claim 1, wherein the first clutch device is immediately adjacent the second clutch device.

5. The power transmission device of claim 1, wherein the first clutch device or the second clutch device drives an additional clutch device that drives the driving wheel.

* * * * *